United States Patent
Miyazaki et al.

(10) Patent No.: US 11,814,482 B2
(45) Date of Patent: Nov. 14, 2023

(54) TRIAZINE RING-CONTAINING POLYMER, AND THERMOPLASTIC ARTICLE AND OPTICAL PART INCLUDING SAME

(71) Applicant: SAMSUNG ELECTRONICS CO., LTD., Suwon-si (KR)

(72) Inventors: Eigo Miyazaki, Hwaseong-si (KR); Masashi Tsuji, Hwaseong-si (KR); Tomoyuki Kikuchi, Hwaseong-si (KR); Yukika Yamada, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 152 days.

(21) Appl. No.: 17/110,823

(22) Filed: Dec. 3, 2020

(65) Prior Publication Data

US 2021/0163682 A1    Jun. 3, 2021

(30) Foreign Application Priority Data

Dec. 3, 2019  (JP) .................................. 2019-218975

(51) Int. Cl.
C08G 73/06  (2006.01)
G02B 1/04  (2006.01)

(52) U.S. Cl.
CPC ........... *C08G 73/0644* (2013.01); *G02B 1/04* (2013.01)

(58) Field of Classification Search
CPC ...... C08G 73/0644; G02B 1/04; G02B 1/041; C08L 81/02

USPC ......................................................... 528/423
See application file for complete search history.

(56) References Cited

U.S. PATENT DOCUMENTS

| 5,652,327 A | 7/1997 | Kang et al. |
| 8,940,818 B2 | 1/2015 | Futterer et al. |
| 2003/0065092 A1* | 4/2003 | Takagi .................... C08L 69/00 525/67 |

FOREIGN PATENT DOCUMENTS

| JP | 1995224162 A | 8/1995 |
| JP | 2014162829 A | 9/2014 |
| KR | 0451442 A | 9/2004 |
| KR | 100521299 A | 10/2005 |

\* cited by examiner

*Primary Examiner* — Ruiyun Zhang
(74) *Attorney, Agent, or Firm* — CANTOR COLBURN LLP

(57) ABSTRACT

Disclosed are a triazine ring-containing polymer having a repeating unit that comprises a structural unit derived from a triazinedithiol compound, the triazine ring-containing polymer having a yellowness index of less than 3 and comprising terminal SH groups, wherein at least a portion of the SH groups are capped with a hydrocarbon group, and a number of the SH groups in the triazine ring-containing polymer is less than about $1\times10^{18}$ per gram of the polymer, and a thermoplastic article and optical part including the polymer.

19 Claims, 4 Drawing Sheets

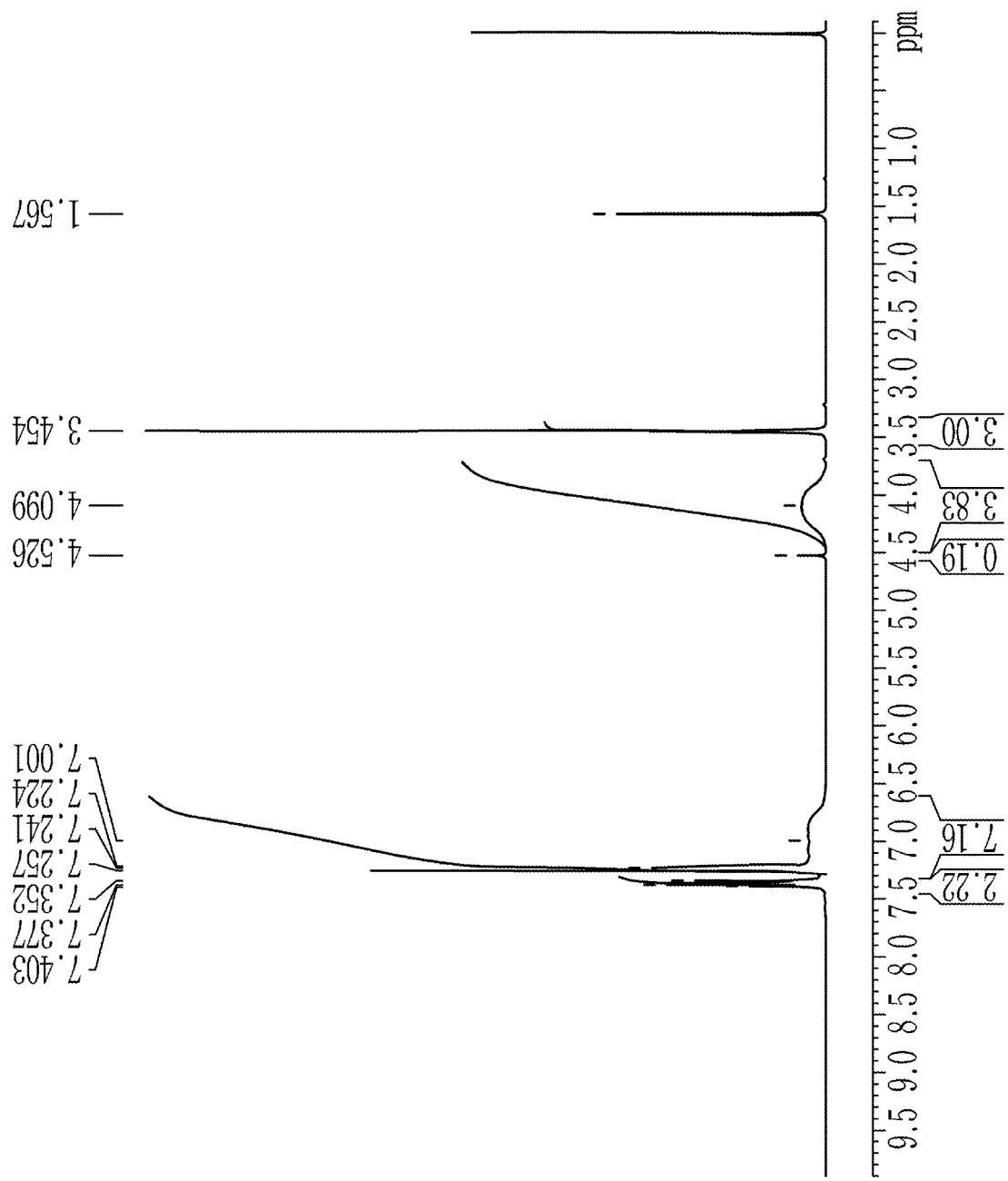

TRIAZINE RING-CONTAINING POLYMER, AND THERMOPLASTIC ARTICLE AND OPTICAL PART INCLUDING SAME

CROSS-REFERENCE TO RELATED APPLICATION

This application claims priority to and the benefit of Japanese Patent Application No. 2019-218975, filed in the Japanese Intellectual Property Office on Dec. 3, 2019, and Korean Patent Application No. 10-2020-0167042, filed in the Korean Intellectual Property Office on Dec. 2, 2020, and all the benefits accruing therefrom under 35 U.S.C. § 119, the entire contents of which are incorporated herein by reference.

BACKGROUND

1. Field

A triazine ring-containing polymer, and a thermoplastic resin and an article, and an optical part including the same are disclosed.

2. Description of the Related Art

Recently, research on optical materials has been actively conducted. Examples of the optical materials may be optical lens materials used in optical systems such as camera-containing devices including cameras, video cameras, vehicle-mounted cameras, or smartphone lenses. The optical lens materials are required to have a high refractive index and a high Abbe's number, and simultaneously have excellent heat resistance, light transparency, and easy molding properties. Compared with glass lenses, resin (polymer) lenses are light weight, do not easily break, and cost less in terms of materials, and thus may be formed into various shapes through an appropriate injection molding for lens formation. However, the thinner lenses necessary for high resolution cameras require a material having a high refractive index.

In order to obtain a polymer having a high refractive index as a resin material, attempts have been made to introduce an aromatic ring, a halogen atom, or a sulfur atom into the polymer. Particularly, an episulfide resin and a thiourethane resin prepared by introducing the sulfur atom can have a refractive index of greater than or equal to about 1.7 but lacks plasticity, which limits commercialization scope.

A triazine ring-containing polymer resin with a high refractive index and having high plasticity has been investigated. For example, Japanese Patent Laid-Open Publication No. 2014-162829 discloses a triazine ring-containing polymer including a repeating unit structure having a triazine ring, and having a refractive index of greater than or equal to about 1.7.

SUMMARY

However, the triazine ring-containing polymer, for example, a polymer including a structural unit derived from a triazine dithiol compound, disclosed in the prior art has a high yellowness index (YI).

An embodiment provides a triazine ring-containing polymer having a repeating unit that comprises a structural unit derived from a triazine dithiol compound, where the polymer has a reduced YI.

The triazine ring-containing polymer having a repeating unit that includes a structural unit derived from a triazine dithiol compound according to an embodiment includes terminal SH groups, wherein at least a portion of the SH groups are capped with a hydrocarbon group, and wherein a number of the SH groups in the triazine ring-containing polymer is less than about $1 \times 10^{18}$ per gram of the polymer.

The triazine ring-containing polymer has a YI of less than 3.

The triazine ring-containing polymer includes a repeating unit represented by General Formula 1:

*-[A-B]*  General Formula 1

In General Formula 1,
A is represented by General Formula 2,
B is represented by General Formula 3, and
indicates a point linked to another group or structural unit,

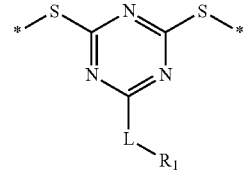

General Formula 2 wherein, in General Formula 2,
L is a single bond or a linking group,
$R_1$ is a group including an oxygen atom (O), sulfur atom (S), nitrogen atom (N), selenium atom (Se), or a combination thereof, and
indicates a point linked to another group or structural unit,

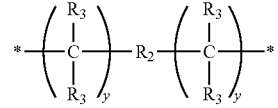

General Formula 3 wherein, in General Formula 3,
$R_2$ is a divalent aromatic hydrocarbon group, or an aromatic hydrocarbon linking group in which two or more aromatic hydrocarbon groups are linked to each other by an alkylene group, an oxygen atom (O), a sulfur atom (S), or a selenium atom (Se),
$R_3$ is each independently a hydrogen atom, an alkyl group, or an aromatic hydrocarbon group,
y is each independently 0 or 1, and
indicates a point linked to another group or structural unit.

An embodiment provides a thermoplastic article including the triazine ring-containing polymer.

An embodiment provides an optical part including the triazine ring-containing polymer.

The triazine ring-containing polymer according to an embodiment has a reduced YI, while having a structural unit derived from a triazine dithiol compound. Accordingly, a thermoplastic article including the triazine ring-containing polymer has an improved transparency and a reduced YI, and thus may advantageously be used for an optical part.

BRIEF DESCRIPTION OF THE DRAWINGS

FIG. 4 is a $^1$H-nuclear magnetic resonance (NMR) spectrum for the polymer of Example 10.

DETAILED DESCRIPTION

Figure 1:
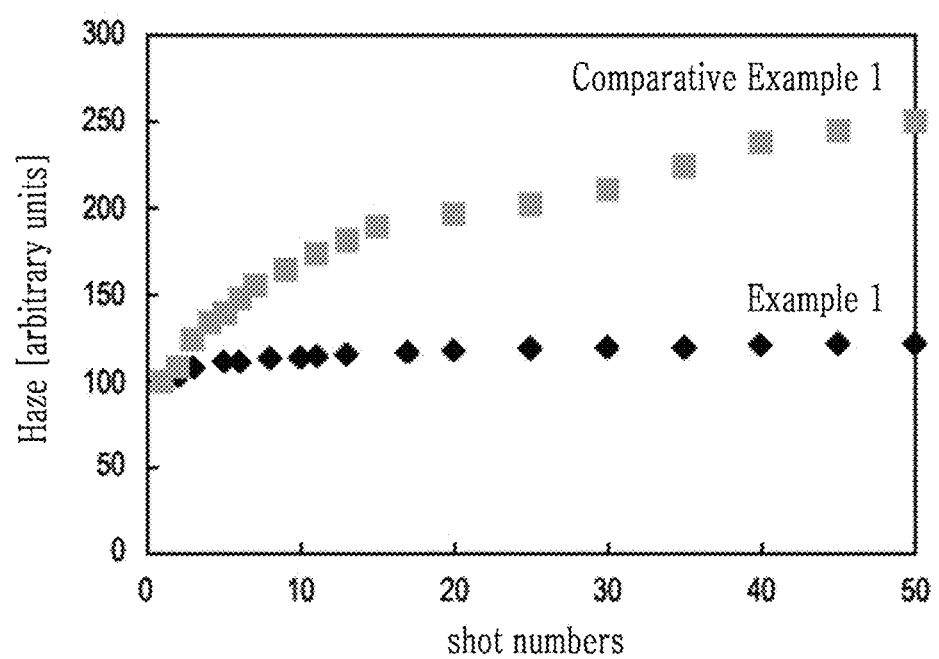
FIG. 1 is a graph showing haze versus shot numbers of the injection molding obtained in Example 1 and Comparative Example 1.

Hereinafter, one or more exemplary embodiments will be described, but the technical scope of the present invention should be determined according to the description of the claims, and is not limited to the following embodiments. In this regard, the present embodiments may have different forms and should not be construed as being limited to the descriptions set forth herein. Accordingly, the embodiments are merely described below to explain aspects. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

As used herein, when a definition is not otherwise provided, the term "aromatic hydrocarbon group" refers to a cyclic group in which all ring members are carbon and at least one ring is aromatic, the group having the specified number of carbon atoms, for example a C6 to C30 arylene group, and specifically a C6 to C18 arylene group, and having a valence of at least one. More than one ring may be present, and any additional rings may be independently aromatic, saturated, or partially unsaturated, and may be fused, pendant, spirocyclic, or a combination thereof. In general formulae and chemical structures, "*" indicates a point linked to another structural unit or atom.

As used herein, unless a special description is provided, each operation, measurement of physical properties, and the like is performed under conditions of room temperature (about 20° C. or higher, about 25° C. or lower) and a relative humidity (RH) of about 40% RH or higher and about 50% RH or lower.

As used herein, in the disclosure the term "triazine ring-containing polymer" may be simply referred to as "polymer," and the term "thermoplastic molded article" may also be simply referred to as "article."

In addition, as used herein, in the disclosure the term "divalent aromatic hydrocarbon linking group, or an aromatic hydrocarbon linking group in which two or more aromatic hydrocarbon groups are linked to each other by an alkylene group, an oxygen atom (O), a sulfur atom (S), or a selenium atom (Se)" may simply be referred to as "a divalent aromatic hydrocarbon group", or "an aromatic hydrocarbon group", or the like.

The triazine ring-containing polymer according to an embodiment has a repeating unit including a structural unit derived from a triazine dithiol compound and includes terminal SH groups, wherein at least a portion of the terminal SH groups are capped with a hydrocarbon group, and wherein a number of the SH groups in the triazine ring-containing polymer is less than about $1 \times 10^{18}$ per gram of the polymer.

The triazine ring-containing polymer has a repeating unit including a structural unit derived from a triazine dithiol compound. The repeating unit may be resented by General Formula 1, and is not limited thereto, as long as it contains a structural unit derived from a triazine dithiol compound:

*-[A-B]*  General Formula 1

In General Formula 1,
A (hereinafter, also referred to as "structural unit A") is represented by General Formula 2,
B (hereinafter, also referred to as 'structural unit B') is represented by General Formula 3, and
indicates a point linked to another structural unit or atom:

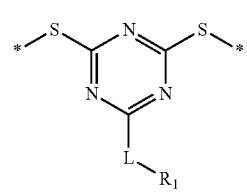

General Formula 2 wherein, in General Formula 2,
L is a single bond or a linking group,
$R_1$ is a group having oxygen atom (O), sulfur atom (S), nitrogen atom (N), selenium atom (Se), or a combination thereof, and
indicates a point linked to another structural unit or atom,

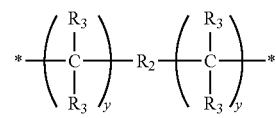

General Formula 3 wherein, in General Formula 3,
$R_2$ is a divalent aromatic hydrocarbon group, or an aromatic hydrocarbon linking group in which two or more aromatic hydrocarbon groups are linked to each other by an alkylene group, an oxygen atom (O), a sulfur atom (S), or a selenium atom (Se), $R_3$ is each independently a hydrogen atom, an alkyl group, or an aromatic hydrocarbon group, y is each independently 0 or 1, and indicates a point linked to another structural unit or atom.

In the triazine ring-containing polymer according to an embodiment, as shown in General Formula 1, the triazine ring in the structural unit A and the structural unit B having a divalent aromatic hydrocarbon group are linked through a thioether bonds (—S—) to form a main chain of the polymer.

The triazine ring-containing polymer according to an embodiment and having the triazine ring in the main chain has a high refractive index, and the refractive index of the polymer may be further improved by introducing the divalent aromatic hydrocarbon linking group into the main chain. In addition, it is considered that a glass transition temperature (Tg) of the polymer may be increased by introducing the divalent aromatic hydrocarbon group into the main chain. The polymer having a high glass transition temperature has high environmental reliability.

In an exemplary embodiment, the triazine ring-containing polymer according to an embodiment may include the structural unit A represented by General Formula 2:

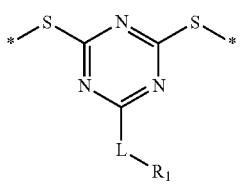

General Formula 2 wherein, in General Formula 2, L is a single bond or a linking group. Herein, that "L is a single bond" means that the triazine and the substituent $R_1$ are directly linked. In addition, when L is a linking group, the linking group is not particularly limited as long as it does not impair the effects of the present disclosure. In an embodiment L may be an alkylene group such as a C1 to C6 alkylene group, for example, a methylene group, an ethylene group, a trimethylene group, a propylene group, an isopropylidene group, a tetramethylene group, a 2-methyltrimethylene group, a 1-methyltrimethylene group, a 1-ethylethylene group, a 1,2-dimethylethylene group, a 1,1-dimethylethylene group, or the like; or a divalent C6 to C30 aromatic hydrocarbon group (e.g., a phenylene group, a biphenylene group, a naphthylene group, a triphenylene group or the like.

From the viewpoints of an improvement of a refractive index, and a reduction of a haze and YI, and the like, L may be a single bond, a methylene group, an ethylene group, a phenylene group, a biphenylene group, a naphthalene group, or the like, among the above groups. For example, L may be a single bond, a methylene group, or a phenylene group, and for example, L may be a single bond.

In General Formula 2, $R_1$ represents a group including at least one atom that is an oxygen atom (O), a sulfur atom (S), a nitrogen atom (N), and a selenium atom (Se). Specific examples of $R_1$ are not particularly limited as long as they do not inhibit the effect of the present disclosure, but may be one of the groups represented by Formulae (4-1) to (4-8):

 (4-1)

 (4-2-1)

 (4-2-2)

 (4-3)

 (4-4)

 (4-5)

 (4-6)

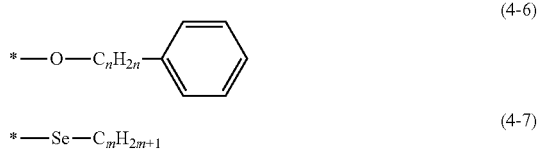 (4-7)

 (4-8)

In Formulae (4-1), (4-5), and (4-7), m is independently an integer of 1 to 6. From the viewpoints of an improvement of a refractive index, and a reduction of a haze and YI, and the like, m may be, for example, an integer of 1 to 6, for example, an integer of 1 to 3, for example, 1 or 2. In an embodiment, they may be represented by the following groups:

—S—CH$_3$ and *—S—C$_2$H$_5$.

In Formulae (4-2-2), (4-6), and (4-8), n is independently an integer of 1 to 6. From the viewpoints of an improvement of a refractive index, and a reduction of a haze and YI, and the like, n may be, for example, an integer of 1 to 3, for example, 1 or 2. In an embodiment, $R_1$ may be represented by the following group:

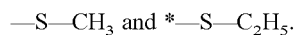

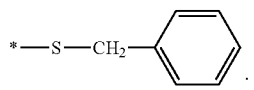.

In Formula (4-4), p is an integer from 1 to 6. From the viewpoints of an improvement of a refractive index, and a reduction of a haze and YI, and the like, p may be an integer from 1 to 5, for example 1 to 3, for example 1 or 2, and $R_1$ may be represented by any one of the following groups:

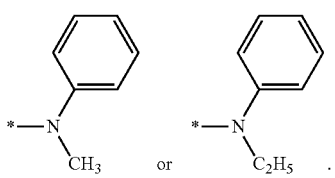

Among the groups, from the viewpoints of an improvement of a refractive index, and a reduction of a haze and YI, and the like, $R_1$ may be, for example, a group represented by formulas (4-1) to (4-4). In other words, in an embodiment of the present disclosure, $R_1$ may be a group represented by any one of Formulae (4-1) to (4-4). For example, $R_1$ may be a group represented by any one of Formulae (4-1), (4-2-1), (4-2-2) and (4-4), for example, by Formula (4-1) or (4-2-2), and for example, the group may be represented by Formula (4-1).

In an exemplary embodiment, the triazine ring-containing polymer according to an embodiment may include the structural unit B represented by General Formula 3:

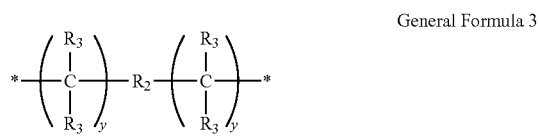

General Formula 3

In General Formula 3, as defined above, $R_2$ is the divalent aromatic hydrocarbon group, or an aromatic hydrocarbon linking group in which two or more aromatic hydrocarbon groups are linked to each other by an alkylene group, an oxygen atom (O), a sulfur atom (S), or a selenium atom (Se). Herein, the divalent aromatic hydrocarbon group is not particularly limited as long as it does not impair the effects of the present disclosure. The aromatic hydrocarbon constituting the divalent aromatic hydrocarbon group may be a non-condensed ring or a condensed ring. For example, it may be a divalent group derived from benzene, pentalene, indene, naphthalene, anthracene, azulene, heptalene, acenaphthalene, phenalene, fluorene, anthraquinone, phenanthrene, biphenyl, terphenyl, quaterphenyl, quinquephenyl, sexiphenyl, triphenylene, pyrene, chrysene, pycene, perylene, pentaphene, pentacene, tetraphene, hexaphene, hexacene, rubicene, trinaphthylene, heptapene, pyranthrene, or the like. Among these, benzene, naphthalene, biphenyl, and triphenyl may be used from the viewpoint of an improvement of a refractive index, and a reduction of a haze and YI, and examples thereof may include benzene and biphenyl.

In addition, when $R_2$ is the aromatic hydrocarbon linking group in which two or more aromatic hydrocarbon groups are linked to each other by an alkylene group, an oxygen atom (O), a sulfur atom (S), or a selenium atom (Se), the aromatic hydrocarbon group is not particularly limited as long as it does not inhibit the effect of the present disclosure. Since the specific examples thereof are the same as the examples in the case where $R_2$ is a divalent aromatic hydrocarbon group, the aromatic hydrocarbon group may be understood as disclosed above. Among these, from the viewpoint of an improvement of a refractive index, and a reduction of a haze and YI, and the like, a divalent aromatic hydrocarbon group derived from benzene or naphthalene, for example, a divalent group derived from benzene (phenylene group) may be used. In addition, in the above embodiment, the number of linked aromatic hydrocarbon groups is not particularly limited as long as the effect of the present disclosure is not impaired. From the viewpoint of an improvement of a refractive index, and a reduction of a haze and YI, and the like, the number of linked aromatic hydrocarbon groups may be 2 to 5. For example, the number of linked aromatic hydrocarbon groups may be 2 or 3, for example, 2.

In the above embodiment, the atom(s) linking the aromatic hydrocarbon groups is also not particularly limited as long as it does not impair the effects of the present disclosure. When $R_2$ is an aromatic hydrocarbon linking group in which two or more aromatic hydrocarbon groups are linked by an alkylene group, the alkylene group is not particularly limited. For example, the alkylene group may be a C1 to C6 linear or branched alkylene group such as a methylene group, an ethylene group, a trimethylene group, a propylene group, an isopropylidene group ($-C(CH_3)_2-$), a tetramethylene group, a 2-methyltrimethylene group, a 1-methyltrimethylene group, a 1-ethylethylene group, a 1,2-dimethylethylene group, or a 1,1-dimethylethylene group. Among these, from the viewpoint of improving the refractive index and glass transition temperature (thermal stability), the group or atom linking the aromatic hydrocarbon groups may be a C2 to C4 alkylene group, or an oxygen atom, or a sulfur atom. For example, the linking group or atom may be an isopropylidene group, or an oxygen atom or a sulfur atom, and in an embodiment, it may be a sulfur atom. For example, when $R_2$ is an aromatic hydrocarbon group in which two or more aromatic hydrocarbons are linked through a sulfur atom, the effect of improving the refractive index and glass transition temperature of the polymer may be further improved.

In the case where $R_2$ is a divalent aromatic hydrocarbon group, positions of the two bonds is not particularly limited. In an embodiment, the two bonds may be positioned at the most distant from each other. For example, if $R_2$ is a phenylene group, two sulfur atoms constituting the main chain may be bound to the para position of the phenylene group.

In an embodiment, $R_2$ may be any one of the following groups:

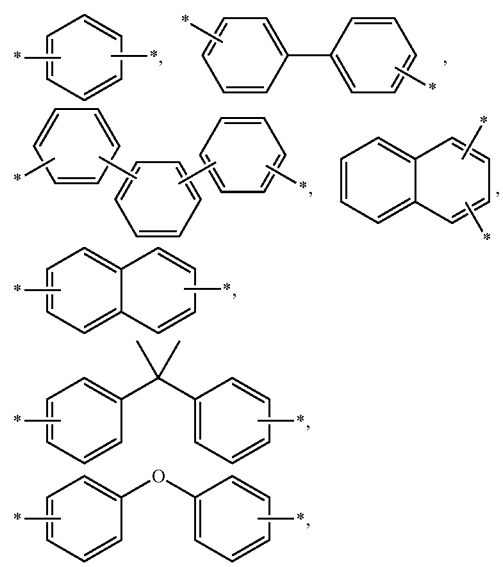

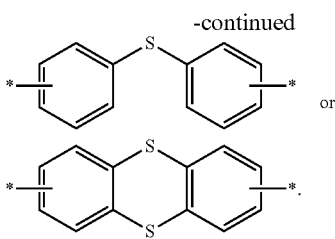

For example, $R_2$ may be any one of the following groups:

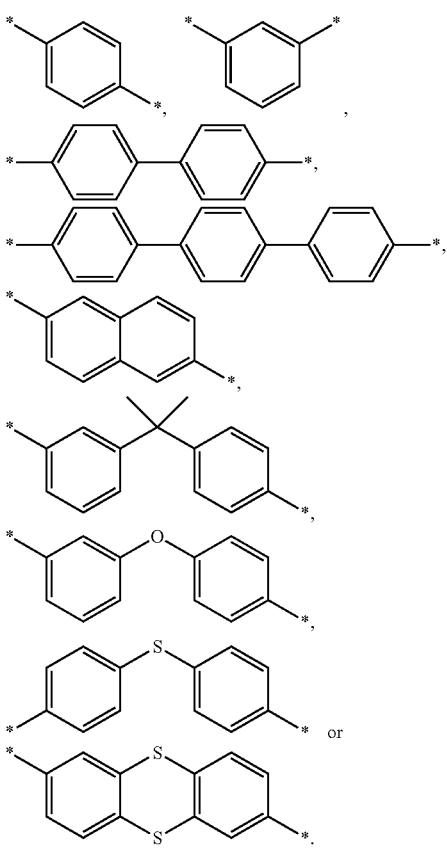

For example, $R_2$ may be any one of the following groups:

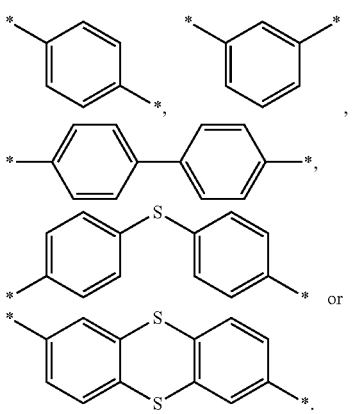

For example, $R_2$ may be any one of the following formulae:

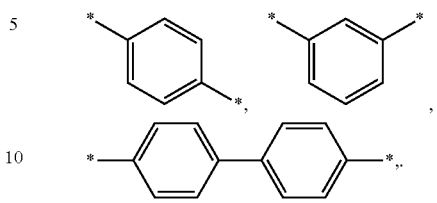

By including the above aromatic hydrocarbon-derived structure, the triazine ring-containing polymer according to an embodiment may further improve the refractive index and reduce the haze and YI.

In General Formula 3, $R_3$ may each independently be an alkyl group and an aromatic hydrocarbon group, but is not particularly limited as long as the effects of the present invention are not impaired. The alkyl group may be, for example, C1 to C8 linear or branched alkyl group. For example, the alkyl group may be a methyl group, an ethyl group, a n-propyl group, an isopropyl group, a n-butyl group, an isobutyl group, a sec-butyl group, a tert-butyl group, a n-pentyl group, an isopentyl group, a tert-pentyl group, a neopentyl group, a 1,2-dimethylpropyl group, a n-hexyl group, an isohexyl group, a 1,3-dimethylbutyl group, a 1-isopropylpropyl group, a 1,2-dimethylbutyl group, a n-heptyl group, a 1,4-dimethylpentyl group, a 3-ethylpentyl group, a 2-methyl-1-isopropylpropyl group, a 1-ethyl-3-methylbutyl group, a n-octyl group, a 2-ethylhexyl group, a 3-methyl-1-isopropylbutyl group, a 2-methyl-1-isopropyl group, a 1-tert-butyl-2-methylpropyl group, and the like. In addition, the aromatic hydrocarbon group may be, for example, a monovalent group derived from benzene, pentalene, indene, naphthalene, anthracene, azulene, heptane, acenaphthylene, phenalene, fluorene, anthraquinone, phenanthrene, biphenyl, terphenyl, quaterphenyl, quinquephenyl, sexiphenyl, triphenylene, pyrene, chrysene, pycene, perylene, pentaphene, pentacene, tetraphene, hexaphene, hexacene, rubicene, trinaphthalene, heptaphene, pyranthrene, and the like. Among these, from the viewpoints of refractive index, transparency, glass transition temperature, solubility and the like, $R_3$ may independently be a hydrogen atom, a methyl group, or a phenyl group, and in an embodiment, it may be, for example, a hydrogen atom or a methyl group.

In General Formula 3, y may each independently be 0 (zero) or 1.

When both y's are 1, the structural unit B may allow the polymer to dissolve well in a solvent due to the two —C($R_3R_3$)— groups present at both ends thereof. When both y's are 0, a high refractive index, as well as excellent thermal stability may be achieved in the polymer.

The triazine ring-containing polymer according to an embodiment has a repeating unit that includes at least one type of the structural unit A, and at least one type of the structural unit B. From the viewpoint of improving solubility of the polymer in a solvent, the triazine ring-containing polymer may include 2 to 5 types of structural units A, and/or include 2 to 5 types of structural units B. For example, the triazine ring-containing polymer according to an exemplary embodiment may include two types of the structural unit A and/or two type of the structural unit B. In other words, each structural unit A and/or B may be the same or different.

That is, in an embodiment, the triazine ring-containing polymer may include structural units represented by General Formula (1-1), and structural units represented by General Formula (1-2):

*-[A'-B-]*                                            (1-1)

*-[A"-B-]-*                                        (1-2).

In General Formulae (1-1) and (1-2), A' and A" are each independently the same as definition of A in General Formula 1, but A' and A" are different from each other (i.e., the structure of A' and the structure of A" are different from each other, and both A' and A" are included as the structural units A in the polymer). In General Formulae (1-1) and (1-2), B is the same as the definition of B in General Formula 1, wherein B in General Formulae (1-1) and (1-2) may be the same (i.e., the structures of B in General Formulae (1-1) and (1-2) may be the same). The triazine ring-containing polymer according to an embodiment may include a structural unit represented by General Formula (1-3), and a structural unit represented by General Formula (1-4):

*-[A-B'-]-*                                          (1-3)

*-[A-B"-]-*                                      (1-4).

In General Formulae (1-3) and (1-4), A is represented by General Formula 2, and

B' (hereinafter, also referred to as "structural unit B'") and B" (hereinafter also referred to as "structural unit B''") are each independently represented by General Formula 3, wherein B' and B" are different from each other. In General Formulae (1-3) and (1-4), A is the same as definition of A in General Formula 1, wherein A of General Formulae (1-3) and (1-4) are the same (i.e., the structures of A in General Formulae (1-3) and (1-4) are the same). Further, B' and B" are each independently the same as the definition of B in General Formula 1, but B' and B" are different from each other (i.e., Although the structures of B' and B" are different from each other, both B' and B" are included in the structural units B of the polymer).

In addition, the triazine ring-containing polymer according to an embodiment may include one or more of a repeating unit represented by General Formula (1-5), a structural unit represented by General Formula (1-6), a structural unit represented by General Formula (1-7), and a structural unit represented by represented by General Formula (1-8):

*-[A'-B'-]-*                                        (1-5)

*-[A"-B'-]-*                                      (1-6)

*-[A'-B"-]-*                                      (1-7)

*-[A"-B"-]-*                                   (1-8).

In General Formulae (1-5), (1-6), (1-7), and (1-8), A' and A" are each independently represented by General Formula 2, wherein A' and A" are different from each other, and B' and B" are each independently represented by General Formula 3, wherein B' and B" are different from each other.

That is, in General Formulae (1-5), (1-6), (1-7), and (1-8), A' and A" are each independently the same as the definition of A of General Formula 1, A' and A" are different from each other (i.e., the structure of A' is different from that of A", but both A' and A" are included in the structural units A of the polymer). In addition, B' and B" are each independently the same as the definition of B in General Formula 1, but B' and B" are different from each other (i.e., the structure of B' is different from the structure of B", but both B' and B" are included in the structural units B of the polymer).

In General Formulae (1-1) to (1-8), since "-A'-" and "-A"-" are each independently the same as the definition of General Formula 2 except that A' and A" are different structures, additional description thereof is not provided herein. Similarly, in General Formulae (1-1) to (1-8), since "-B'-" and "—B"-" are each independently the same as the definition of General Formula 3 except that B' and B" are different structures, additional description thereof is not provided herein.

As used herein, the structural unit of "-A'-" is also simply referred to as "structural unit A'."

The structural unit of "-A"-" is also simply referred to as "structural unit A"."

Similarly, the structural unit of "—B'-" is also simply referred to as "structural unit B'."

The structural unit of "-B"-" is also simply referred to as "structural unit B"."

As described above, the polymer including two or more and five or less different structural units A and/or two or more and five or less different structural units B may exhibit excellent solubility in solvents. For this reason, it is desirable, for example, during purification by reprecipitation.

In addition, in an embodiment including two or more and five or less different structural units A, at least one of the two or more structural units A may be, for example, represented by General Formulae (4-1), (4-3), or (4-4). For example, A may be selected from groups represented General Formulae (4-1) and (4-3). The effect of further lowering the haze and YI may be exhibited by selecting at least one of the two or more and five or less structural units A from the above groups.

When the triazine ring-containing polymer includes the structural unit A' and the structural unit A", a combination of the structural unit A' and the structural unit A" is not particularly limited as long as it does not impair the effects of the present disclosure. From the viewpoints of improving refractive index, and lowering haze and YI, and the like, the structural unit A' may be for example a group in which $R_1$ in General Formula 2 is represented by the following formulae:

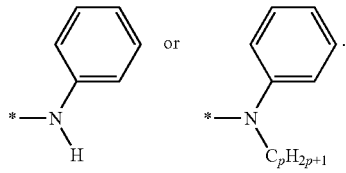

Alternatively, the structural unit A" may be a group in which $R_1$ of General Formula 2 is represented by the following formulae:

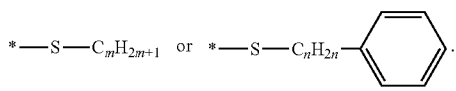

In an exemplary embodiment, the structural unit A' may be a group in which $R_1$ in General Formula 2 is represented by the following formulae:

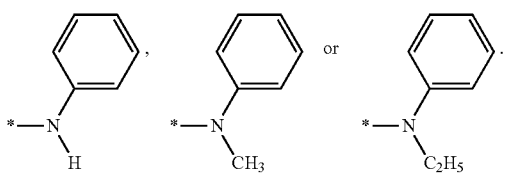

Alternatively, in another embodiment, the structural unit A″ may be a group in which $R_1$ of General Formula 2 is represented by the following formulae:

*—S—CH$_3$ or *—S—C$_2$H$_5$.

In another exemplary embodiment, the structural unit A′ may be a group in which $R_1$ in General Formula 2 is represented by the following formulae:

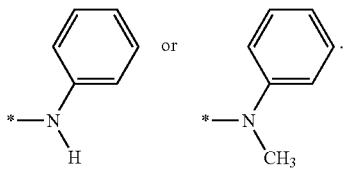

Alternatively, in another exemplary embodiment, the structural unit A″ may be a group in which $R_1$ of General Formula 2 is represented by the following formula:

*—S—CH$_3$.

In the above embodiments, a molar ratio of the structural unit A′ and the structural unit A″ is not particularly limited as long as it does not impair the effects of the present disclosure. From the viewpoint of improving the refractive index and lowering haze and YI, and the like, the molar ratio (mole ratio) of the structural unit A′ (for example, $R_1$ of General Formula 2 is —N(phenyl)(hydrogen atom or alkyl group)) and the structural unit A″ (for example, $R_1$ of General Formula 2 is —S(alkyl group) or —S-(alkylene group-phenyl group)) in the polymer may be about 5 to 95:95 to 5, for example, about 10 to 90:90 to 10, for example, about 20 to 80:80 to 20, for example, about 25 to 75:75 to 25 when the total number of the structural unit A′ and the structural unit A″ is 100. For Example, the molar ratio of the structural unit A′ and the structural unit A″ in the polymer may be about 5:95, about 10:90, about 15:85, about 20:80, about 25:75, about 30:70, about 35:65, about 40:60, about 45:55, about 50:50, about 55:45, about 60:40, about 65:35, about 70:30, about 75:25, about 80:20, about 85:15, about 90:10, about 95:5, when the total number of the structural unit A′ and the structural unit A″ is 100.

When the triazine ring-containing polymer includes the structural unit B′ and the structural unit B″, a combination of the structural unit B′ and the structural unit B″ is not particularly limited as long as it does not impair the effects of the present disclosure. From the viewpoint of improving refractive index, excellent transparency and low haze when increasing an amount of inorganic particles in an organic-inorganic composite, and the like, the structural unit B′ may be a group in which $R_2$ in General Formula 3 is represented by the following formula:

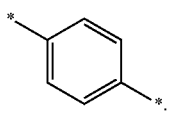

Alternatively, the structural unit B″ may be a group in which $R_2$ in General Formula 3 is represented by the following formula:

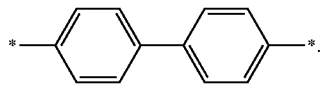

In the above embodiments, a molar ratio of the structural unit B′ and the structural unit B″ is not particularly limited as long as it does not impair the effects of the present disclosure. From the viewpoint of improving the refractive index, lowering haze and YI, and the like, the molar ratio of the structural units B′ (for example, $R_2$ of General Formula 3 is phenylene group) and structural units B″ (for example, $R_2$ of General Formula 3 is p-biphenylene group) may be, for example, about 10 to 90:90 to 10, for example, about 50 to 80:50 to 20 when the total number of structural units B′ and constituent units B″ is 100. For Example, the molar ratio of the structural unit B′ and the structural unit B″ in the polymer may be about 10:90, about 15:85, about 20:80, about 25:75, about 30:70, about 35:65, about 40:60, about 45:55, about 50:50, about 55:45, about 60:40, about 65:35, about 70:30, about 75:25, about 80:20, about 85:15, about 90:10, when the total number of the structural unit B′ and the structural unit B″ is 100.

The triazine ring-containing polymer according to an embodiment may include structural units (hereinafter, also referred to as "other structural units") other than the structural unit represented by General Formula 1. However, in an embodiment, other structural units may not be included. Even if other structural units are included, a molar ratio of the number of other structural units relative to the total number of structural units may be less than or equal to about 10 mole percent (mol %). For example, a content of other structural units may be less than or equal to about 5 mol %, for example less than or equal to about 3 mol %, less than or equal to about 1 mol %, or 0 mol %. When the molar ratio of the other structural units is within the above range, reduction of the refractive index of the polymer and the difficulty in molding processes such as heat press and injection molding may be prevented.

When the triazine ring-containing polymer includes two or more structural units, that is, it is a copolymer, the arrangement form of the structural units is not particularly limited. The arrangement may have a block form (block copolymer), a random form (random copolymer), or an alternate form (alternating copolymer).

The triazine ring-containing polymer according to an embodiment may have terminal SH groups, at least a portion of which are capped with a hydrocarbon group (that is, at least a portion of the hydrogen atoms of the terminal SH groups are substituted with hydrocarbon groups). In this case, the hydrocarbon group is not particularly limited as long as it does not impair the effects of the present disclosure. For example, the hydrocarbon group may be the groups represented by any of Chemical Formulae (a-1) to (a-3). One of the hydrocarbon groups may be used alone, or a combination thereof may be used.

*—C$_m$H$_{m+1}$ (a-1)

*—Ar$_1$ (a-2)

*—C$_n$H$_{2n}$—Ar$_2$ (a-3)

In Chemical Formula (a-1), m indicates an integer ranging from 1 to 6. From the viewpoints of improving refractive index, lowering haze and YI, and the like, m may be an integer ranging from 1 to 3, for example, 1 or 2. The hydrocarbon group may be, for example, methyl group, ethyl group, and the like. In Chemical Formula (a-2), $Ar_1$ may be a substituted or unsubstituted aromatic hydrocarbon group. Herein, the aromatic hydrocarbon group is not particularly limited as long as it does not impair the effects of the present disclosure. For example, the aromatic hydrocarbon group may be a monovalent group derived from any one of benzene, pentalene, indene, naphthalene, anthracene, azulene, heptalene, acenaphthalene, phenalene, fluorene, anthraquinone, phenanthrene, biphenyl, terphenyl, quaterphenyl, quinquephenyl, sexiphenyl, triphenylene, pyrene, chrysene, pycene, perylene, pentaphene, pentacene, tetraphene, hexaphene, hexacene, rubicene, trinaphthylene, heptapene, pyranthrene, or the like. Among these, benzene, biphenyl, and the like may be used from the viewpoint of an improvement of a refractive index, and a reduction of a haze and YI, and examples thereof may include phenyl group.

In Chemical Formula (a-3), n may be an integer ranging from 1 to 6. From the viewpoints of improving refractive index, lowering haze and YI, and the like, m may be an integer ranging from 1 to 3, for example, 1 or 2. The hydrocarbon group may be, for example, methylene group, ethylene group, and the like, and is not limited thereto.

$Ar_2$ may be a substituted or unsubstituted aromatic hydrocarbon group. Herein, the aromatic hydrocarbon group is not particularly limited as long as it does not impair the effects of the present disclosure. For example, the aromatic hydrocarbon group may be a monovalent group derived from any one of benzene, pentalene, indene, naphthalene, anthracene, azulene, heptalene, acenaphthalene, phenalene, fluorene, anthraquinone, phenanthrene, biphenyl, terphenyl, quaterphenyl, quinquephenyl, sexiphenyl, triphenylene, pyrene, chrysene, pycene, perylene, pentaphene, pentacene, tetraphene, hexaphene, hexacene, rubicene, trinaphthylene, heptapene, pyranthrene, or the like. Among these, phenyl group, naphthyl group, and the like may be used from the viewpoint of an improvement of a refractive index, and a reduction of a haze and YI, and examples thereof may include phenyl group.

When $Ar_1$ in Chemical Formula (a-2) or $Ar_2$ of Chemical Formula (a-3) is a substituted aromatic hydrocarbon group, the substituent is not particularly limited as long as it does not impair the effects of the present disclosure. For example, the substituent may be an alkyl group having 1 to 6 carbon atoms, such as, for example, methyl group, ethyl group, n-propyl group, isopropyl group, n-butyl group, or the like.

According to an exemplary embodiment, the hydrocarbon group may be any one of the following groups:

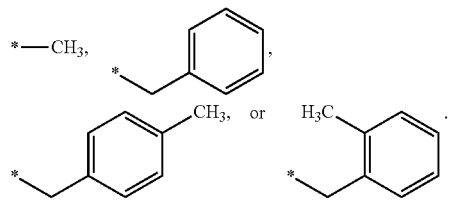

For example, the hydrocarbon group may be selected from the following group:

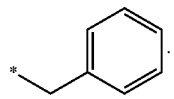

By capping the terminal SH group with the hydrocarbon group, haze and YI may be reduced.

A number of the terminal SH groups in the triazine ring-containing polymer according to an embodiment may be less than about $1\times10^{18}$ per gram of the polymer. In the context of the specification, the number of the terminal SH groups may use the value measured by titration using an urea standard solution as described in the Examples below. The number of SH groups, from the viewpoints of further lowering haze and YI, may be less than about $5\times10^{17}$ per gram of the polymer, for example, less than about $2.5\times10^{17}$ per gram of the polymer, or for example, less than about $2\times10^{17}$ per gram of the polymer. Without being bound by theory, it is believed that the reason why the haze and YI of the polymer are reduced by reducing the number of SH groups may be due to decreased coloring due to a reaction with an oxidant, such as, for example, oxygen, or degradation of the polymer may become difficult. Further, as a thione (i.e., thioketone) derived from keto-enol conversion may also be suppressed, coloring might be prevented. Accordingly, the triazine ring-containing polymer according to an embodiment may maintain low haze and YI even after being injection molded. Without being bound by theory, it is believed that thermostability of the polymer to the heat of the injection molding is improved due to the reduction of the number of the SH groups.

In the triazine ring-containing polymer according to an embodiment, the number of the other functional group is not particularly limited as long as it does not impair the effects of the present disclosure. However, from the viewpoint of preventing coloring when heating the polymer, the number of the other functional group rather than the SH group may be small. The other functional group may include, for example, fluoro group, chloro group, bromo group, iodo group, p-toluene sulfonyl group, trifluoromethyl sulfonyl group, nitro group, or the like, and is not limited thereto. The number of the other functional group rather than the SH group may be less than about $1\times10^{19}$ per gram of the polymer, or for example, less than about $5\times10^{18}$ per gram of the polymer. The number of the other functional group rather than the SH group may use the value measured by the method using combustion ion chromatography or $^1$H-NMR as described in the Examples below.

The triazine ring-containing polymer according to an embodiment may have a refractive index ($n_d$) of, for example, greater than or equal to about 1.68, greater than or equal to about 1.69, greater than or equal to about 1.70 or greater than or equal to about 1.71, but is not limited thereto.

The triazine ring-containing polymer may have a haze of less than 4%, for example less than or equal to about 3%, less than or equal to about 2.5%, less than or equal to about 2%, or less than or equal to about 1.8%, but is not limited thereto.

Further, the triazine ring-containing polymer may have a YI of less than 3, for example less than or equal to about 2, less than or equal to about 1, or less than or equal to about 0.7, but is not limited thereto.

When the refractive index ($n_d$), haze, and YI are within the above ranges, an article having a high refractive index suitable for optical parts may be obtained. As used herein, the values measured by the method described in examples below are used for the refractive index ($n_d$), haze, and YI.

The triazine ring-containing polymer according to an embodiment has a glass transition temperature (Tg). The Tg may be, an inflection point observed in a differential calorimeter curve by differential scanning calorimetry. The resin having the glass transition temperature has thermoplasticity and may be processed by injection molding. The glass transition temperature of the triazine ring-containing polymer may be greater than or equal to about 80° C. and less than or equal to about 190° C., for example, greater than or equal to about 90° C. and less than or equal to about 160° C., for example, greater than or equal to about 100° C. and less than or equal to about 140° C. The glass transition temperature may be adjusted by controlling the structures of the structural units A and/or structural units B. For example, by introducing a bulky structure and a rigid structure to one or more of $R_1$ groups in General Formula 2 and/or $R_2$ and/or $R_3$ in General Formula 3, the glass transition temperature may be increased. As used herein, the Tg values measured by the method described in the examples below are used for the glass transition temperature.

The weight average molecular weight (Mw) of the triazine ring-containing polymer according to an embodiment may be greater than about 5,000 Dalton (Da) and less than or equal to about 1,000,000 Da, for example, greater than or equal to about 5,000 Da and less than or equal to about 900,000 Da, greater than or equal to about 5,000 Da and less than or equal to about 800,000 Da, greater than or equal to about 5,000 Da and less than or equal to about 700,000 Da, greater than or equal to about 5,000 Da and less than or equal to about 600,000 Da greater than or equal to about 5,000 Da and less than or equal to about 500,000 Da, greater than or equal to about 5,000 Da and less than or equal to about 400,000 Da, greater than or equal to about 5,000 Da and less than or equal to about 300,000 Da, greater than or equal to about 10,000 Da and less than or equal to about 500,000 Da, greater than or equal to about 10,000 Da and less than or equal to about 400,000 Da, greater than or equal to about 10,000 Da and less than or equal to about 300,000 Da, greater than or equal to about 20,000 Da and less than or equal to about 1,000,000 Da, greater than or equal to about 20,000 Da and less than or equal to about 900,000 Da, greater than or equal to about 20,000 Da and less than or equal to about 800,000 Da, greater than or equal to about 20,000 Da and less than or equal to about 700,000 Da, greater than or equal to about 20,000 Da and less than or equal to about 600,000 Da, greater than or equal to about 20,000 Da and less than or equal to about 500,000 Da, greater than or equal to about 20,000 Da and less than or equal to about 400,000 Da, greater than or equal to about 20,000 Da and less than or equal to about 300,000 Da, greater than or equal to about 20,000 Da and less than or equal to about 200,000 Da, greater than or equal to about 20,000 Da and less than or equal to about 150,000 Da, greater than or equal to about 20,000 Da and less than or equal to about 100,000 Da, greater than or equal to about 20,000 Da and less than or equal to about 90,000 Da, greater than or equal to about 20,000 Da and less than or equal to about 80,000 Da, greater than or equal to about 20,000 Da and less than or equal to about 70,000 Da, greater than or equal to about 20,000 Da and less than or equal to about 60,000 Da, or greater than or equal to about 20,000 Da and less than or equal to about 50,000 Da, and is not limited thereto. When the weight average molecular weight is within the above numerical range, the transmittance (transparency) and heat resistance of the article may be improved, and the mechanical strength of the article may also be improved. The method of controlling the weight average molecular weight within the above numerical range is not particularly limited, but a method of controlling the polymerization reaction time may be used. As used herein, the value measured by the method described in the examples below is used for the weight average molecular weight values.

A method for preparing the triazine ring-containing polymer according to an embodiment is not particularly limited. For example, as shown in Reaction Scheme 1, the triazine ring-containing polymer according to an embodiment may be prepared by first reacting a triazine dithiol compound with an aromatic compound having a leaving group in the presence of a phase transfer catalyst to provide a polymer. Subsequently, the polymer and a capping agent (BzCl in Reaction Scheme 1) are reacted in the presence of a phase transfer catalyst to provide a triazine ring-containing polymer according to an embodiment.

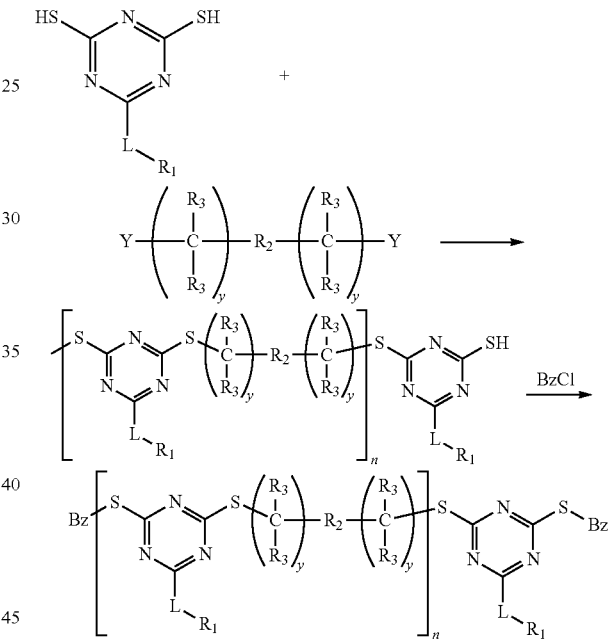

Reaction Scheme 1

In Reaction Scheme 1, $R_1$ is the same as defined in General Formula 2, $R_2$, $R_3$, and y are the same as defined in General Formula 3, and Y indicates a leaving group, such as, a halogen atom.

Examples of Y include fluoro atom, chloro atom, bromine atom, iodine atom, tosyl(p-toluensulfonyl) group, triflyl (trifluoromethylsulfonyl) group, nitro group, or the like, and is not limited thereto. The triazine dithiol compound is not particularly limited and may be appropriately selected from, for example, 2-methylthio-1,3,5-triazine-4,6-dithiol, 2-ethylthio-1,3,5-triazine-4,6-dithiol, 2-benzylthio-1,3,5-triazine-4,6-dithiol, 2-(2'-phenylethylthio)-1,3,5-triazine-4,6-dithiol, 2-methoxy-1,3,5-triazine-4,6-dithiol, 2-ethoxy-1,3,5-triazine-4,6-dithiol, 2-benzyloxy-1,3,5-triazine-4,6-dithiol, 2-anilino-1,3,5-triazine-4,6-dithiol, 2-(N-methylanilino)-1,3,5-triazine-4,6-dithiol, or the like, but is not limited thereto. The triazine dithiol compounds may be used alone or in a combination of two or more.

The aromatic compound having a leaving group may be appropriately selected from, for example, α, α'-dibromo-p- xylene, α, α'-dichloro-p-xylene, α, α'-dibromo-o-xylene, α, α'-dichloro-o-xylene, α, α'-dibromo-m-xylene, α, α'-dichloro-m-xylene, 4,4'-bis(bromomethyl)biphenyl, 4,4'-bis(chloromethyl)biphenyl, α, α'-ditosyl-p-xylene, or the like, but is not limited thereto. The aromatic compound having a leaving group may be used alone or in a combination of two or more.

In the polymerization reaction, a ratio between the triazine dithiol compound and the aromatic compound having a leaving group is not particularly limited. For example, the aromatic compound having a leaving group may be used in an amount of greater than or equal to about 0.91 mole equivalent to less than or equal to about 1.05 mole equivalent based on 1 mole equivalent of SH group of the traizinedithiol compound. For example, the ratio may be greater than or equal to about 0.94 mole equivalent to less than or equal to about 0.97 mole equivalent.

When the SH group and the leaving group are reacted in the same mole equivalent, the obtained polymer may have terminal groups in which both the SH group and the leaving group are present. In this case, if the polymer is exposed at a high temperature, a terminal SH group of the polymer may react with a leaving group of another polymer to become a gel, or the polymer may become colored, which is not desirable. By reacting the SH group and the leaving group within the above ratio, a ratio of the polymer having a terminal SH group may increase. In this way, gelling or coloring of the polymer may be suppressed.

As in the above, the triazine ring-containing polymer according to an embodiment may be prepared by reacting a triazine dithiol compound with an aromatic compound having a leaving group in the presence of a phase transfer catalyst to provide a polymer. Subsequently, the polymer and a capping agent (MeSNa in Reaction Scheme 2) are reacted in the presence of a phase transfer catalyst to provide a triazine ring-containing polymer according to an embodiment.

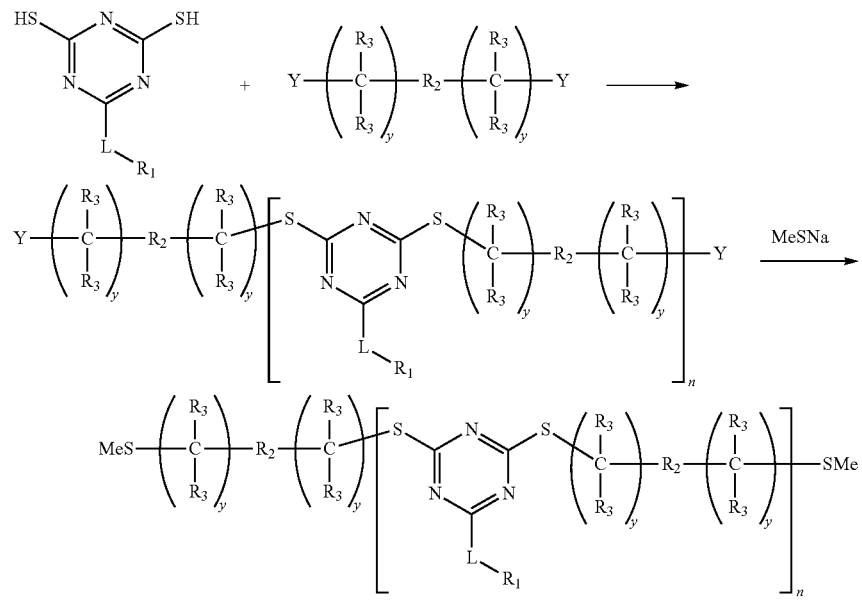

Reaction Scheme 2

In this case, polymers having leaving groups Y at all the terminal groups may be prepared by using the aromatic compound having a leaving group in an amount of greater than the equimolar amount. The obtained polymer may be reacted with another capping agent, such as, for example, sodium methyl thiolate, and the like, in one-pot to obtain an inactive polymer.

After capping the terminal group, the amount of the terminal group of the polymer may be analyzed by measuring the amount of halogen atoms, remaining in the polymer by using a combustion ion chromatography method, if Y is a halogen or a triflyl group.

However, most capping agent, such as, for example, a thiolate type capping agent, may be toxic or may have a bad smell derived from thiol, and purification or transporting the capping agent or the byproducts of the reaction may be costly. Further, a nucleophilic capping agent, as shown in Reaction Scheme 3, may further react with a thioether group linked to a triazine group, i.e., a side reaction. If the side reaction occurs, reactive SH group may fail to produce the capping effect.

Reaction Scheme 3

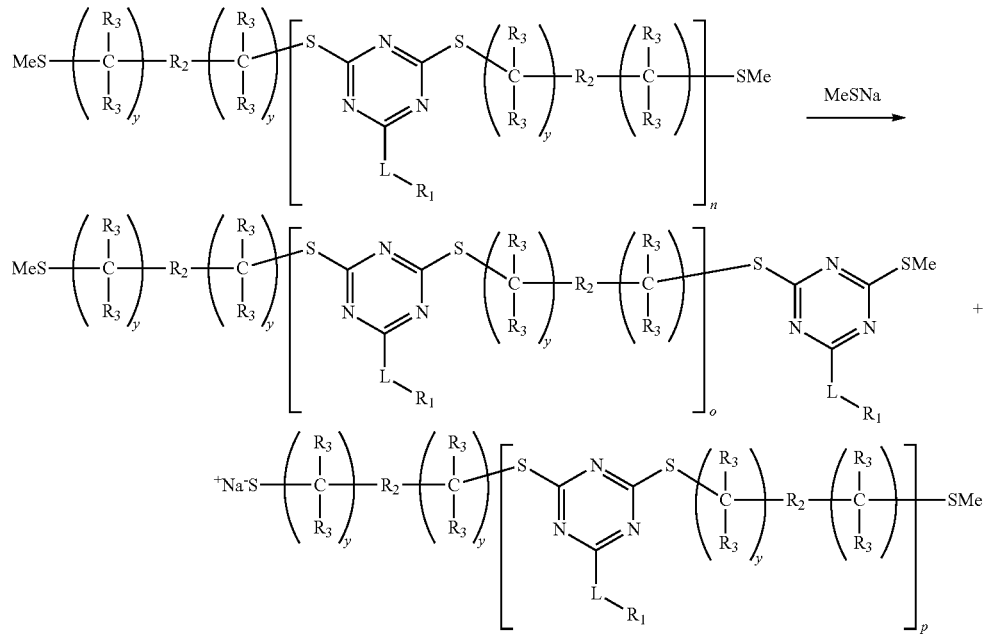

Accordingly, although a less colored polymer may be obtained from any of the two methods, i.e., a method of leaving SH groups to be capped with a capping agent or a method of leaving groups to be capped with a capping agent during the polymerization reaction, the former method, i.e., leaving SH groups to be capped with a capping agent may be more advantageous.

A method of controlling the molecular weight of the polymer is not particularly limited, and controlling polymerization reaction time or mole ratio of monomers, including one-functional monomer (reaction stopper) in the starting material, and the like, may be used.

In order to obtain polymers having different molecular weights, a reaction stopper may be added to the starting materials in addition to various monomers. In this case, the molecular weight of the polymer may be reduced in proportion to the amount of the added reaction stopper. This is because the reaction stopper may react with the monomers during the polymerization reaction, and thus the polymerization reaction may stop, as shown below. For example, first, as shown in Reaction Scheme 4, a triazine dithiol compound and an aromatic compound having a leaving group may react in the presence of a phase transfer catalyst to provide a polymer. In this case, a monomer having two leaving groups and a monomer having one leaving group (i.e., a reaction stopper) may be used as the aromatic compound, and the ratio of the two monomers may vary to control the molecular weight. Subsequently, the obtained polymer and a capping agent (BzCl in Reaction Scheme 4) react in the presence of the phase transfer catalyst to provide a triazine ring-containing polymer according to an embodiment. The capping agent may be the same as or different from the reaction stopper.

Reaction Scheme 4

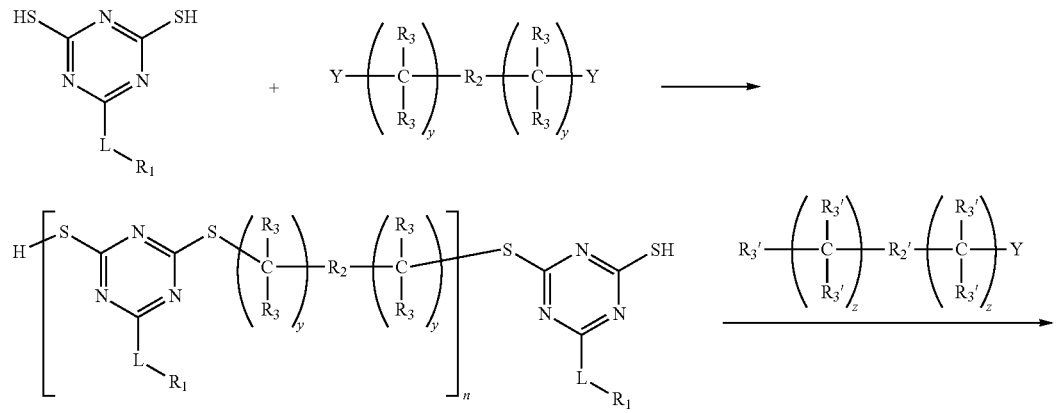

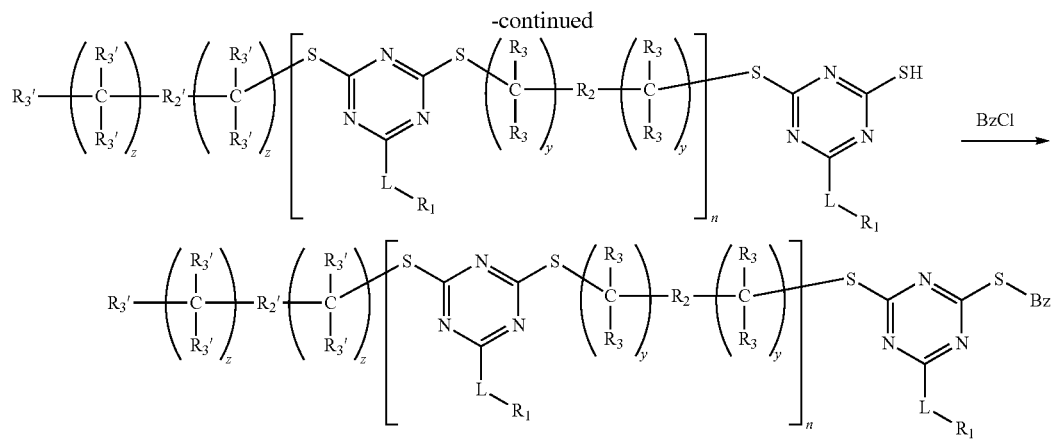

In Reaction Scheme 4, $R_1$ is the same as defined in General Formula 2, $R_2$, $R_3$, and y are the same as defined in General Formula 3, $R_{2'}$, $R_{3'}$, and z are the same as defined in $R_2$, $R_3$, and y, and Y indicates a leaving group, such as, a halogen atom.

As a capping agent, a compound having a leaving group, such as, for example, a halogen, is linked to the hydrocarbon group. In this case, examples of the leaving group may be, as same as Y, a fluorine atom, a chlorine atom, a bromine atom, an iodine atom, a tosyl group (p-toluenesulfonyl group), a triflyl group (trifluoromethylsulfonyl group), and a nitro group, but are not limited thereto. Specific examples of the capping agent include benzyl chloride, benzyl bromide, 2-bromoethylbenzene, bromomethane, methane iodide, α-chloro-p-xylene, α-chloro-o-xylene, 1-(chloromethyl) naphthalene, and the like, and are not limited thereto. The capping agent may be used alone or in a combination of two or more.

An amount of the capping agent is not particularly limited as long as the number of SH group may reduce. For example, an amount of the capping agent may be from two times to 10 times, for example, 3 times to 8 times, for example, from 3 times to 6 times by the difference between the triazinedithiol compound and the aromatic compound having a leaving group, and is not limited thereto.

The method of reacting the polymer and capping agent is not particularly limited. For example, in an exemplary embodiment, the reaction between the triazinedithiol compound and the aromatic compound, and the reaction between the polymer and the capping agent may be performed in one-pot. That is, the method of preparing the triazin ring-containing polymer according to an embodiment includes a first process of reacting a triazinedithiol compound and an aromatic compound having a leaving group in the presence of a phase transfer catalyst, and a second process of adding a capping agent to the reaction mixture of the first process to react. By using the one-pot method to react the polymer and a capping agent, the number of SH groups in the polymer may be significantly reduced compared with the method in which the obtained polymer is purified and then reacts with a capping agent. Further, the one-pot method may reduce cost and/or process steps. Without being bound by theory, it may be that the significant reduction in the number of —SH groups is due to the SH group at the terminal end of the polymer may convert to an —S—Na$^+$ group to more easily react with the capping agent in the one-pot method. In an embodiment, once the obtained polymer is isolated, the terminal end of the polymer becomes a —SH group, and thus the reaction between the SH group at the terminal end of the polymer and a base may be reduced when subjected to the terminal capping reaction, such that the efficiency of terminal capping reaction may be reduced.

In order to reduce thiol groups at the terminal end of the polymer, the ratios of the monomers may be reversed, or the monomers containing Y are present in a greater than equimolar ratio. In this case, when the monomer containing Y is used in an amount of greater than the equimolar ratio, it is also possible to simultaneously control the molecular weight of the polymer.

Reaction Scheme 5

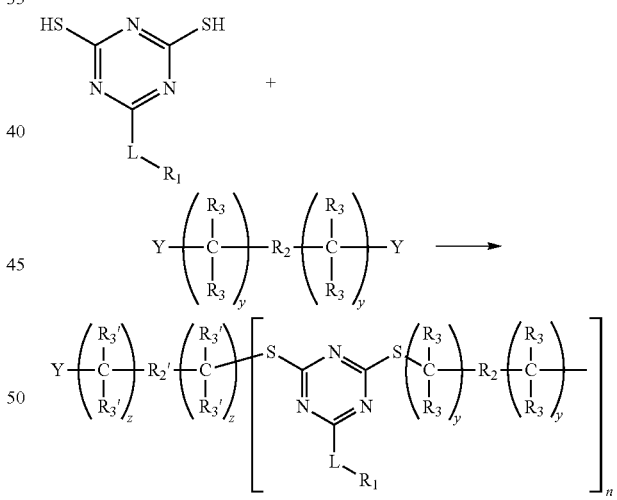

As a phase transfer catalyst used in the reaction between a triazinedithiol compound and an aromatic compound having a leaving group, and/or between a polymer and a capping agent, a long-chain alkyl quaternary ammonium salt, a crown ether, and the like may be used, which are known for use in the interfacial polycondensation reaction. Specific examples of the phase transfer catalyst may include, for example, brominated tetrabutyl ammonium, brominated hexadecyl trimethylammonium, and the like.

The reaction system may be a two-phase system of water and an organic solvent, for example, an organic solvent such as chloroform, dichloromethane, benzonitrile, and nitrobenzene, and water may be used as the two-phase system. During the reaction, bases such as sodium hydroxide and potassium hydroxide may be added to react them at greater than or equal to about −10° C. and less than or equal to about 100° C. for greater than or equal to about 1 hour and less than or equal to about 120 hours.

The triazine ring-containing polymer obtained through the above methods may be purified by a general purification method such as a reprecipitation method, a dialysis method, an ultrafiltration method, and an extraction method. Further, the obtained triazine ring-containing polymer may be dried, for example, under vacuum, at room temperature to about 120° C., in order to completely remove the remaining solvent included in the polymer. As such, the completely dried polymer may be used to evaluate refractive index, and the like.

Thermoplastic Article and Optical Parts

An embodiment provides a thermoplastic molded article including the triazine ring-containing polymer. An embodiment provides an optical part comprising the triazine ring-containing polymer.

A shape of the article is not particularly limited but any type, for example, lens-type (spherical lens, nonspherical lens, fresnel lens, and the like), film-type, sheet-type, plate-type, bar-type, fiber-type, prism-type, and the like. The article may be manufactured, for example, in a well-known method such as an injection molding method, a compression molding method, an extrusion method, a transfer method, a blow method, a pressure method, a coating method (a spin coating method, a roll coating method, a curtain coating method, a dip coating method, a casting method, and the like) and the like. Among them, the polymer according to the embodiment may be used in an injection molding. Before forming the article, a kneading apparatus such as a Henschel mixer, a kneader, a banbury mixer, an extruder, and the like may be used to mix raw materials. When the injection molding is adopted, a cylinder temperature may be, for example, greater than or equal to about 150° C. and less than or equal to about 300° C. and a molding temperature of greater than or equal to about 50° C. and less than or equal to about 100° C.

The optical part may be appropriately used as an optical part transmitting light (a passive optical part) in a display (for example, a display for a smart phone, a liquid crystal display, a plasma display, and the like), an imaging system (for example, a camera, a video, and the like), an optical pickup, a projector, an optical fiber communication equipment (for example, an optical amplifier and the like), a head lamp for a vehicle, and the like. These optical parts may include, for example, lens, a film, an optical waveguide, a prism, a prism sheet, a panel, an optical disk, a sealant of LED, and the like. These optical parts may have, if necessary, various functional layers such as an anti-reflection layer, a light absorption layer, a hard coating layer, an antiglare layer, and the like.

EXAMPLES

Hereinafter, exemplary aspects of the present disclosure will be described in detail with reference to examples, but the present disclosure is not limited to the aspects of the following examples.

In the following examples, "parts" indicates "parts by weight" unless it is particularly specified otherwise.

Measurement Methods of Properties

Number average molecular weight ($M_n$) and weight average molecular weight ($M_w$) The number average molecular weight ($M_n$) and the weight average molecular weight ($M_w$) of the polymer were measured by the following method.

A measurement sample was prepared by dissolving a polymer in N-methyl-2-pyrrolidone (NMP) to a concentration of 0.1 weight percent (wt %) and filtering the solution with a polytetrafluoroethylene membrane filter having a bore diameter of 0.2 micrometers (μm). A number average molecular weight and a weight average molecular weight of the sample were measured through gel permeation chromatography (GPC) using tetrahydrofuran as a mobile phase with a differential refractometer as a detector. Monodisperse polystyrene was used as a standard material of a molecular weight.

Refractive Index ($n_d$)

A refractive index ($n_d$) the polymer was measured in the following method.

After the polymerization reaction, the reaction solution is added dropwise to excess isopropyl alcohol and reprecipitated to purify the polymer, and this specimen (solid) is dried at 100° C. under vacuum for 48 hours. 2 gram (g) of example polymer were then compression-molded under conditions of 200° C. and 3 megapascal (MPa), and a molded plate having a length of 3 centimeters (cm), a width of 3 cm, and a thickness of 0.5 millimeters (mm) was manufactured. A refractive index of the molded plate at a wavelength of about 473 nanometers (nm), about 594 nm, and about 657 nm was measured with a prism coupler (Model 2010, Metricon Corp.). The measured values were used to calculate a refractive index at a C-ray (about 656.3 nm), a d-ray (about 587.6 nm), and an F-ray (about 486.1 nm).

Among these values, a refractive index at the d-ray (587.6 nm) is commonly regarded as a refractive index ($n_d$).

Haze

Haze was measured using a molded plate manufactured to have the specified "refractive index ($n_d$)" with a haze meter NDH5000 (Suga Test Instruments Co., Ltd.).

Yellowness Index (YI)

YI was measured using a molded plate manufactured to have the specified "refractive index ($n_d$)" with a colorimeter CM5 (Konica Minolta Co., Ltd.).

Heating Test and Transparency Measurement 0.2 gram of the solid polymer was weighed and put in a 10 milliliter (mL) screw vial, and was put into an inert gas oven (Mitsuhiro thermosystem, NH-9N1). Then, the temperature was raised from room temperature to about 250° C. at a rate of 10° C./minute, under nitrogen atmosphere (i.e., oxygen concentration of less than 10 parts per million (ppm)), maintained at 250° C. for about 30 minutes, and cooled down to room temperature to provide a heated sample.

Samples before and after heating were dissolved in solvent (N-methyl-2-pyrrolidone (NMP)) to become 1 weight % solutions. The solutions were subjected to the measurement of transmittance at 400 nm (in 1 cm quartz cell, using a crystal of N-methyl-2-pyrrolidone (NMP) as a control) by using ultraviolet-visible spectrometer (Shimazu Co. Ltd., UV-3100PC).

Number of SH Groups 0.2 gram of the solid polymer was weighed and dissolved in 50 milliliters (mL) of tetrahydrofuran (THF), 1 mL of pyridine is added thereto, and titrated with a separately prepared urea standard solution. Used volume of the urea standard solution for the titration is determined as V1 (mL). The urea standard solution was prepared by dissolving 0.05 gram of urea in 100 mL of THF. 50 mL of THF was also titrated as a blank. Used volume of the urea standard solution for the titration of the THF is determined as V2

(mL). The Volume (V) (mL) of the urea standard solution for titration of the polymer is determined by subtracting V2 (mL) from V1 (mL). As two mole of SH group react with 1 mole of urea, the number of SH groups in 1 gram of polymer is calculated as follows:

Number of SH group(number/gram)=(C×V×0.62× $10^{23}$×2)/0.2

C: Concentration of the urea standard solution (mol/mL)
V: Volume of the urea standard solution (mol/mL) for titration of the polymer.

Number of Chlorine Atoms

1. Measurement Using Combustion Ion Chromatography 1.0 milligram of the polymer was weighed and combusted by using a pretreated sample combustion instrument for ion chromatography, AQF-21000H (Mitsubishi Chemicals Analytech Co., Ltd.) at a temperature of 1,000° C. for 1 hour. The oxidized gas by combustion is adsorbed to the eluent, and the concentration of chlorine atom was obtained as weight % (ppm) by using an ion chromatography measurement device (Metrom, Compact 930 IC Flex). The number of chlorine atom was calculated by using the concentration (wt %) of the chlorine atom as follow:

Number of chlorine atom per 1 gram of polymer (number/gram)=(Concentration of chlorine atom (ppm) g/polymer 1 g)×$10^{-6}$/(35.45 g/mol)× 6.02×$10^{23}$(number/mol)

=(Concentration of chlorine atom (ppm) g/polymer 1 g)×(1.70×$10^{16}$)

2. Measurement Using $^1$H-NMR 5.00 milligram of the polymer was weighed and dissolved in a chloroform solution. $^1$H-NMR was measured by using NMR measurement device (Bruke, 300 MHz). By comparing the ratio of the integrals of the hydrogen (H) derived from chloromethyl group including a leaving group and the hydrogen (H) derived from triazine methyl group (hydrogen atom 3 atoms), the number of chlorine atom included in 1 mole of polymer can be calculated. By using the value (number of chlorine atom included in 1 mole of polymer), the number of chlorine atom included in 1 gram of polymer is calculated according to the following equation:

Number of chlorine atom included in 1 gram of polymer(number/gram)={(Concentration of Chlorine atom (mol)/1 gram of polymer)/(number average molecular weight of the polymer g/mol)}×6.02×$10^{23}$(number/mol)

Example 1: Synthesis of Triazine Ring-containing Polymer (P-1a)

2-(N-methylanilino)-1,3,5-triazine-4,6-dithiol (MA-1, 20 g, 0.080 mole (mol)) was placed in a 500 mL flask, 70 mL of pure water was added thereto, and then, 10 molar (M) NaOH aqueous solution (21.7 g, 0.16 millimole (mmol)) was added thereto. Separately, α,α'-dichloro-p-xylene (MB-1) (13.1 g, 0.077 mmol) was dissolved in 70 mL of chloroform, and then, was added to the aqueous solution. 1.3 g of tetramethyl ammonium bromide was added thereto, and then, vigorously stirred at 50° C. for 12 hours. Benzyl chloride (1.9 mL) was added to the reaction solution, and was further vigorously stirred at 50° C. for 3 hours. The reaction solution was cooled down to room temperature (at 25° C.), water was added, and the organic layer was repeatedly washed with water. After washing, the organic layer was dropwise added in isopropyl alcohol and reprecipitated and then filtered, and a filtrate therefrom was obtained as a white triazine ring-containing polymer (P-1a). A number average molecular weight of the obtained polymer is 43,200 Da, and a weight average molecular weight thereof is 96,300 Da. In this example, with respect to 100 mol % of 2-(N-methylanilino)-1,3,5-triazine-4,6-dithiol (MA-1), 96 mol % of α, α'-dichloro-p-xylene (MB-1) is stoichiometrically added to perform a polymerization reaction (Reaction Scheme 6).

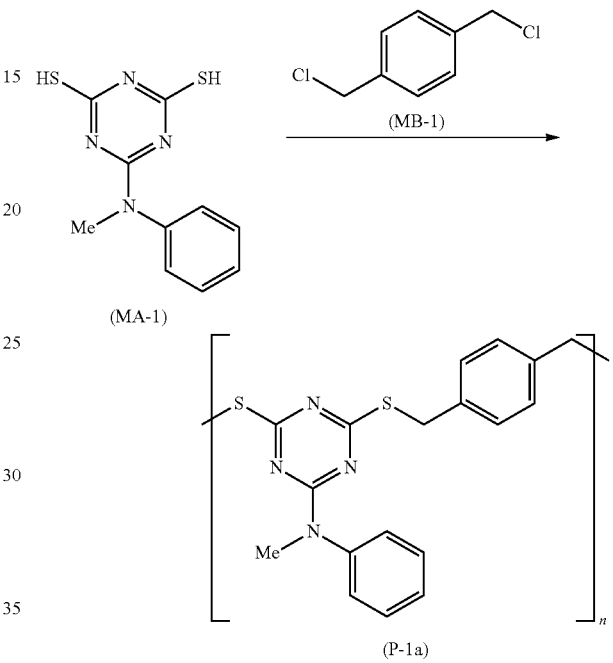

Example 2: Synthesis of Triazine Ring-Containing Polymer (P-1 b)

A triazine ring-containing polymer (P-1 b) was obtained according to the same method as Example 1 except that methane iodide (2.0 mL) was used instead of benzyl chloride in treating the terminal end of the polymer. The obtained polymer has a number average molecular weight of 42,900 Da and a weight average molecular weight of 93,500 Da.

Example 3: Synthesis of Triazine Ring-Containing Polymer (P-1c)

A triazine ring-containing polymer (P-1c) was obtained according to the same method as Example 1 except that the α-chloro-p-xylene (2.1 mL) was used instead of the benzyl chloride in treating the terminal end of the polymer. The obtained polymer has a number average molecular weight of 41,500 Da and a weight average molecular weight of 88,400 Da.

Comparative Example 1: Synthesis of Triazine Ring-Containing Polymer (P-1)

A triazine ring-containing polymer (P-1) was obtained according to the same method as Example 1 except that the benzyl chloride is not added to the polymerization reaction.

The obtained polymer has a number average molecular weight of 40,300 Da and a weight average molecular weight of 88,600 Da.

Evaluation 1

Using the above measuring methods, the number of SH group, haze, and YI of the triazine ring-containing polymers of Examples 1 to 3 and Comparative Example 1 were measured. The results are shown in Table 1.

TABLE 1

| | Polymer | Capping Agent | Number of SH groups (number/gram) | Haze (%) | YI | |
|---|---|---|---|---|---|---|
| Example 1 | P-1a | Benzene dichloride | $1.9 \times 10^{17}$ | 1.9 | 0.7 | One pot |
| Example 2 | P-1b | Methane iodide | $1.8 \times 10^{17}$ | 1.8 | 0.7 | One pot |
| Example 3 | P-1c | α-chloro-p-xylene | $2.0 \times 10^{17}$ | 2.0 | 0.8 | One pot |
| Comparative Example 1 | P-1 | none | $1.0 \times 10^{19}$ | 4.0 | 3.0 | Not treated terminal |

As shown in Table 1, the polymers according to Examples 1 to 3, of which the terminals are capped in one-pot method, have two (2) ordered reduced number of SH groups compared with that of Comparative Example 1, which is not treated with the capping agent. Further, the polymers according to Examples 1 to 3, of which the terminals are capped in one-pot method, have 50% to 55% reduced haze and 73% to 77% reduced YI compared with that of Comparative Example 1.

From these results, it is noted that haze and YI of a polymer may be reduced by reducing the number of SH groups in the polymer.

Example 4: Synthesis of Triazine Ring-Containing Polymer (P-1a')

The triazine ring-containing polymer of Comparative Example 1 (P-1) (10 gram) was put into a flask and dissolved in chloroform (100 mL). Tetrabutyl ammonium bromide (0.2 g), NaOH aqueous solution (1.5 mL), pure water (50 mL), and benzyl chloride (1.5 mL) were added thereto, and the mixture was stirred at 50° C. for 12 hours. Then, the reaction solution was cooled to room temperature (25° C.), water was added, and the organic layer was washed three times with water. Then, the organic layer was dropwise added in isopropyl alcohol and reprecipitated and then filtered, and a filtrate therefrom was obtained as a white triazine ring-containing polymer (P-1a'). A number average molecular weight of the obtained polymer is 40,400 Da, and a weight average molecular weight thereof is 88,500 Da.

Example 5: Synthesis of Triazine Ring-Containing Polymer (P-1 b')

A triazine ring-containing polymer (P-1b') was obtained according to the same method as Example 4 except that methane iodide (2.0 mL) was used instead of benzyl chloride in treating the terminal end of the polymer. The obtained polymer has a number average molecular weight of 40,200 Da and a weight average molecular weight of 87,600 Da.

Evaluation 2

Using the above measuring methods, the number of SH group, haze, and YI of the triazine ring-containing polymers of Examples 4 and 5 were measured. The results are shown in Table 2.

TABLE 2

| | Polymer | Capping agent | Number of SH groups (number/gram) | Haze (%) | YI | |
|---|---|---|---|---|---|---|
| Example 4 | P-1a' | Benzene dichloride | $7.9 \times 10^{17}$ | 2.1 | 1.5 | Terminal treated after purification |
| Example 5 | P-1b' | Methane iodide | $8.4 \times 10^{17}$ | 2.2 | 1.6 | Terminal treated after purification |

As shown in Table 2, the polymers according to Examples 4 and 5, of which the terminals are capped after purification, have greater than 10% reduced number of SH groups compared with that of Comparative Example 1, of which the terminal is not capped. Further, the polymers according to Examples 4 and 5, of which the terminals are capped after purification, have 45% to 48% reduced haze and 47% to 55% reduced YI compared with that of Comparative Example 1.

Comparing the results of Examples 1 and 2 in Table 1 and Examples 4 and 5 in Table 2, it is noted that both the methods of treating the terminal in one-pot method and of treating the terminal after purification can significantly reduce the number of SH groups, haze, and YI. Specifically, by treating the terminal in one-pot method, the number of SH groups may drastically reduce, and haze and YI may also significantly reduce.

Example 6: Synthesis of Triazine Ring-Containing Polymer (P-1c-1)

2-(N-methylanilino)-1,3,5-triazine-4,6-dithiol (MA-1, 1.5 g, 0.0059 mol) was put into a 30 mL flask, 5 mL of pure water was added thereto, and then, 10 M NaOH aqueous solution (1.6 g, 0.0121 mmol) was added thereto. Separately, α,α'-dichloro-p-xylene (MB-1) (0.99 g, 0.0056 mmol) and α-chloro-p-xylene (MB-1') (0.016 mL, 0.0001 mmol) was dissolved in 8.5 mL of chloroform, and then, was added to the aqueous solution. 0.10 g of tetrabutyl ammonium bromide was added thereto, and then, vigorously stirred at 50° C. for 12 hours. Benzyl chloride (0.16 mL) was added to the reaction solution, and was further vigorously stirred at 50° C. for 3 hours. The reaction solution was cooled down to room temperature (at 25° C.), water was added, and the organic layer was repeatedly washed with water. After washing, the organic layer was added dropwise in isopropyl alcohol and reprecipitated and then filtered, and a filtrate therefrom was obtained as a white triazine ring-containing polymer (P-1c-1). A number average molecular weight of the obtained polymer is 16,700 Da, and a weight average molecular weight thereof is 33,300 Da. In this example, with respect to 100 mol % of 2-(N-methylanilino)-1,3,5-triazine-4,6-dithiol (MA-1), 95 mol % of α, α'-dichloro-p-xylene (MB-1) and 2 mol % of a-chloro-p-xylene (MB-1') are stoichiometrically added to perform a polymerization reaction (Reaction Scheme 7).

Reaction Scheme 7

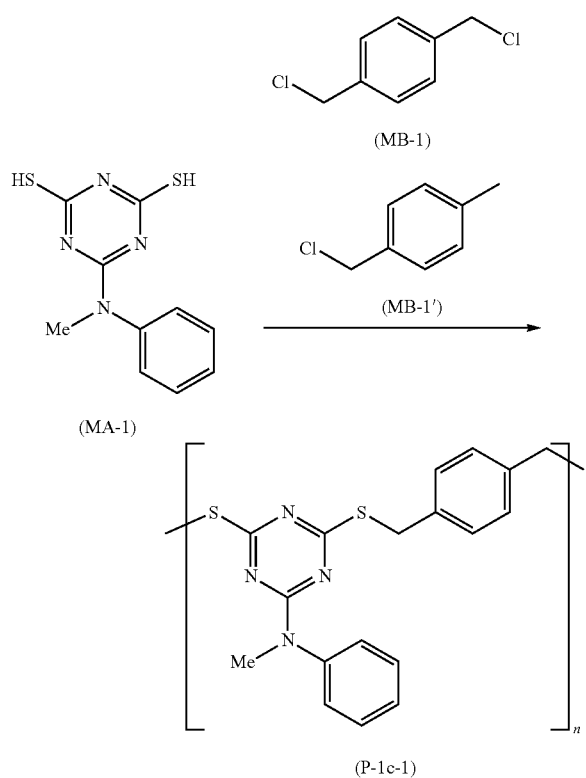

(P-1c-1)

Example 7: Synthesis of Triazine Ring-Containing Polymer (P-1c-2)

A triazine ring-containing polymer (P-1c-2) was obtained according to the same method as Example 6 except that 94 mol % and 4 mol % of α, α'-dichloro-p-xylene (MB-1) and α-chloro-p-xylene (MB-1'), respectively, were stoichiometrically added to 100 mol % of 2-(N-methylanilino)-1,3,5-triazine-4,6-dithiol (MA-1) to perform a polymerization reaction. The obtained polymer has a number average molecular weight of 10,400 Da and a weight average molecular weight of 21,300 Da.

Example 8: Synthesis of Triazine Ring-Containing Polymer (P-1c-3)

A triazine ring-containing polymer (P-1c-3) was obtained according to the same method as Example 6 except that 91 mol % and 10 mol % of α, α'-dichloro-p-xylene (MB-1) and α-chloro-p-xylene (MB-1'), respectively, were stoichiometrically added to 100 mol % of 2-(N-methylanilino)-1,3,5-triazine-4,6-dithiol (MA-1) to perform a polymerization reaction. The obtained polymer has a number average molecular weight of 4,900 Da and a weight average molecular weight of 10,200 Da.

Example 9: Synthesis of Triazine Ring-Containing Polymer (P-1c-4)

2-(N-methylanilino)-1,3,5-triazine-4,6-dithiol (MA-1, 1.5 g, 0.00059 mol) was put in a 30 mL flask, 5 mL of pure water was added thereto, and then, 10 M NaOH aqueous solution (1.6 g, 0.0121 mmol) was added thereto. Separately, α,α'-dichloro-p-xylene (MB-1) (1.08 g, 0.0061 mmol) was dissolved in 8.5 mL of chloroform, and then, was added to the aqueous solution. 0.10 g of tetramethyl ammonium bromide was added thereto, and then, vigorously stirred at 50° C. for 12 hours. Benzyl chloride (0.16 mL) was added to the reaction solution, and was further vigorously stirred at 50° C. for 3 hours. The reaction solution was cooled down to room temperature (at 25° C.), water was added, and the organic layer was repeatedly washed with water. After washing, the organic layer was added dropwise in isopropyl alcohol and reprecipitated and then filtered, and a filtrate therefrom was obtained as a white triazine ring-containing polymer (P-1c-4). A number average molecular weight of the obtained polymer is 3,900 Da, and a weight average molecular weight thereof is 17,300 Da. In this example, with respect to 100 mol % of 2-(N-methylanilino)-1,3,5-triazine-4,6-dithiol (MA-1), 103 mol % of α, α'-dichloro-p-xylene (MB-1) was stoichiometrically added to perform a polymerization reaction.

Example 10: Synthesis of Triazine Ring-Containing Polymer (P-1c-5)

A triazine ring-containing polymer (P-1c-5) was obtained according to the same method as Example 9 except that 105 mol % of α, α'-dichloro-p-xylene (MB-1) was stoichiometrically added to 100 mol % of 2-(N-methylanilino)-1,3,5-triazine-4,6-dithiol (MA-1) to perform a polymerization reaction. The obtained polymer has a number average molecular weight of 2,400 Da and a weight average molecular weight of 9,700 Da.

Comparative Example 2: Synthesis of Triazine Ring-Containing Polymer (P-1-1)

A triazine ring-containing polymer (P-1-1) was obtained according to the same method as Example 6 except that α-chloro-p-xylene (MB-1') was not used in treating the terminal of the polymer. The obtained polymer has a number average molecular weight of 16,000 Da and a weight average molecular weight of 33,900 Da.

Comparative Example 3: Synthesis of Triazine Ring-Containing Polymer (P-1-2)

A triazine ring-containing polymer (P-1-2) was obtained according to the same method as Example 7 except that α-chloro-p-xylene (MB-1') was not used in treating the terminal of the polymer. The obtained polymer has a number average molecular weight of 10,100 Da and a weight average molecular weight of 20,900 Da.

Comparative Example 4: Synthesis of Triazine Ring-Containing Polymer (P-1-3)

A triazine ring-containing polymer (P-1-3) was obtained according to the same method as Example 8 except that α-chloro-p-xylene (MB-1') was not used in treating the terminal of the polymer. The obtained polymer has a number average molecular weight of 4,700 Da and a weight average molecular weight of 9,700 Da.

Evaluation A

Using the above measuring methods, the number of SH group and transparency at 400 nm of the liquid solutions of the triazine ring-containing polymers of Examples 3, 6 to 10, and Comparative Examples 1 to 4 before and after heat treatment were measured.

Figure 3:
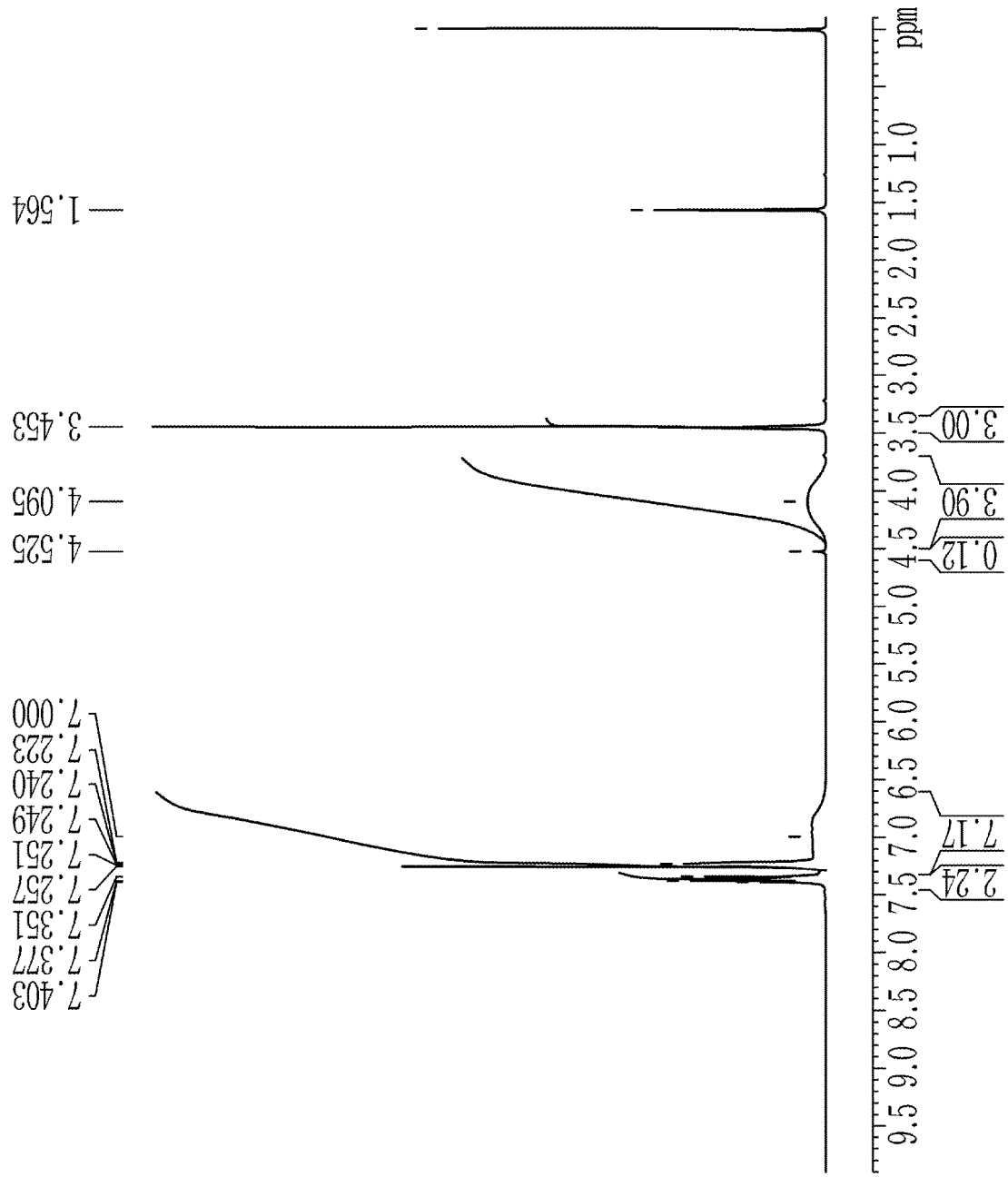
FIG. 3 is a $^1$H-nuclear magnetic resonance (NMR) spectrum for the polymer of Example 9.

With respect to the number of chlorine atom, the combustion ion chromatography method is used for the polymers of Examples 3, 6 to 8, and Comparative Examples 1 to 4, while the $^1$H-NMR method is used for the polymer of Examples 9 and 10 (FIG. 3 and FIG. 4 indicate the $^1$H-NMR charts).

The results are shown in Table 3.

TABLE 3

| | Polymer | Number of SH groups (No./gram) | Number of Chlorine atom (No./g) | Transparency at 400 nm (before heat treatment) (%) | Transparency at 400 nm (after heat treatment) (%) | |
|---|---|---|---|---|---|---|
| Example 3 | P-1c | $2.0 \times 10^{17}$ | $3.5 \times 10^{18}$ | >99 | 98 | |
| Example 6 | P-1c-1 | $1.9 \times 10^{17}$ | $3.9 \times 10^{18}$ | >99 | 98 | |
| Example 7 | P-1c-2 | $2.1 \times 10^{17}$ | $4.2 \times 10^{18}$ | >99 | 98 | |
| Example 8 | P-1c-3 | $2.3 \times 10^{17}$ | $4.5 \times 10^{18}$ | >99 | 98 | |
| Example 9 | P-1c-4 | $2.1 \times 10^{17}$ | $9.3 \times 10^{18}$ | >99 | 98 | |
| Example 10 | P-1c-5 | $1.9 \times 10^{17}$ | $2.4 \times 10^{18}$ | >99 | 97 | |
| Comparative Example 1 | P-1 | $1.0 \times 10^{19}$ | $3.8 \times 10^{18}$ | >99 | 94 | Not terminal treated |
| Comparative Example 2 | P-1-1 | $2.7 \times 10^{19}$ | $4.1 \times 10^{18}$ | >99 | 94 | Not terminal treated |
| Comparative Example 3 | P-1-2 | $4.5 \times 10^{19}$ | $4.3 \times 10^{18}$ | >99 | 93 | Not terminal treated |
| Comparative Example 4 | P-1-3 | $9.7 \times 10^{19}$ | $4.7 \times 10^{18}$ | >99 | 91 | Not terminal treated |

As shown in Table 3, comparing the polymers according to Examples 3, and 6 to 10, and the polymers according to Comparative Examples 1 to 4, the number of chlorine atoms at terminal ends are similar to each other. However, in the polymers according to the Examples, regardless of the molecular weight of the polymers, if the terminal SH groups of the polymers are capped, the transparency at 400 nm of the polymers have hardly changed after the heat treatment, which shows that there is little heat stress.

However, the polymers according to the Comparative Examples, of which the terminal SH groups were not treated, show greater than 5% lowered transparency after the heat treatment, which shows the polymers have low heat resistance. Further, from the result of Comparative Example 1, in which the transparency at 400 nm is significantly reduced, the effect of terminal SH group treatment with a capping agent may significantly exhibit in specifically a polymer having a low molecular weight.

Generally, in a polymer having same composition but different molecular weight, as the molecular weight decreases, more terminal ends of the polymer are present per unit weight. Therefore, as the molecular weight become smaller, the number of SH groups at the terminal ends of the polymer increases, and thus, the polymer is more easily yellowed.

Further, with respect to the polymers according to Examples 3, 9, and 10, of which the SH groups at the terminal ends are capped with a capping agent, the transparencies at 400 nm of the polymers hardly change after being heat treated, even when the number of chlorine atoms increased. However, from a viewpoint of changes in transparency after heat treatment, the fewer number of chlorine atoms in a polymer may be more desirable when the polymer is used as a material for an optical part.

Example 11: Synthesis of Triazine Ring-Containing Polymer (P-2a)

A triazine ring-containing polymer (P-2a) was obtained according to the same method as Example 1 except that 2-anilino-1,3,5-triazine-4,6-dithiol (MA-2) was used instead of 2-(N-methylanilino)-1,3,5-triazine-4,6-dithiol (MA-1) in the polymerization reaction. The obtained polymer has a number average molecular weight of 32,900 Da and a weight average molecular weight of 74,000 Da.

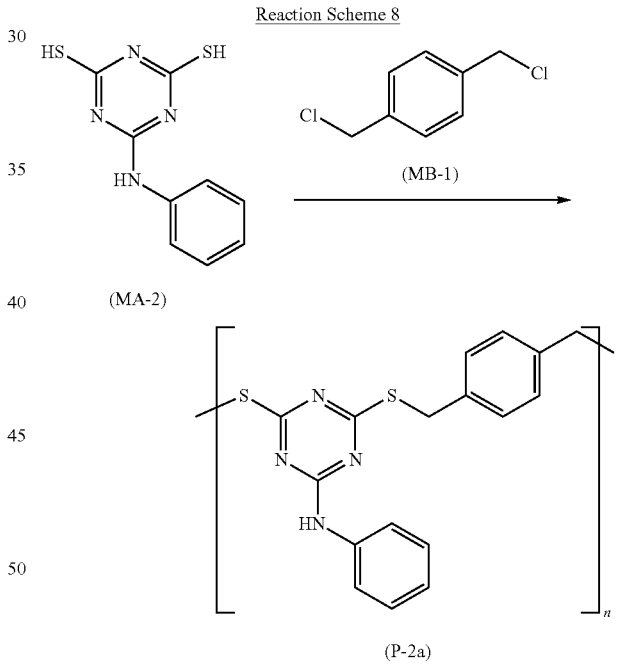

Example 12: Synthesis of Triazine Ring-Containing Polymer (P-3a)

A triazine ring-containing polymer (P-3a) was obtained according to the same method as Example 1 except that 4,4'-bis(chloromethyl)biphenyl (MB-2) was used instead of α,α'-dichloro-p-xylene (MB-1) in the polymerization reaction. The obtained polymer has a number average molecular weight of 25,900 Da and a weight average molecular weight of 52,800 Da.

Reaction Scheme 9

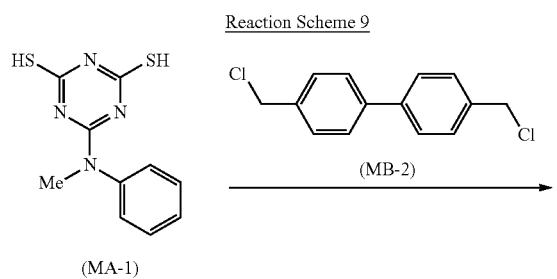

Reaction Scheme 10

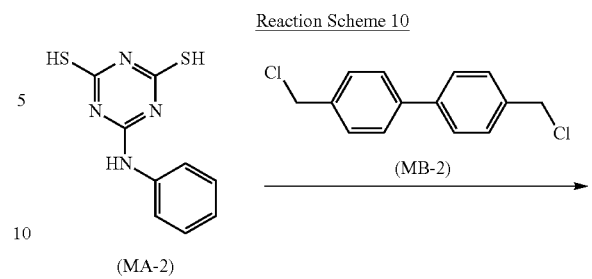

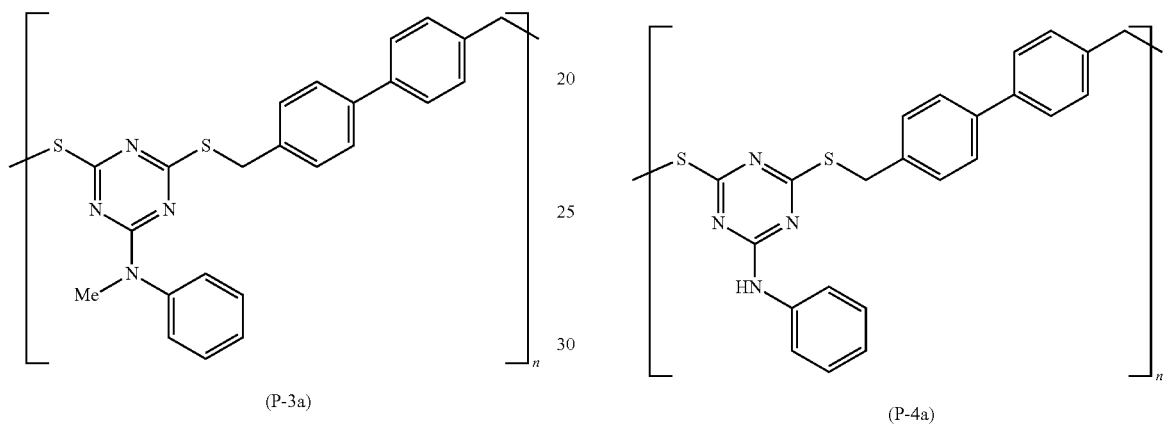

Example 13: Synthesis of Triazine Ring-Containing Polymer (P-4a)

A triazine ring-containing polymer (P-4a) was obtained according to the same method as Example 11 except that 4,4'-bis(chloromethyl)biphenyl (MB-2) was used instead of α,α'-dichloro-p-xylene (MB-1) in the polymerization reaction. The obtained polymer has a number average molecular weight of 21,500 Da and a weight average molecular weight of 54,000 Da.

Example 14: Synthesis of Triazine Ring-Containing Polymer (P-5a)

A triazine ring-containing polymer (P-5a) was obtained according to the same method as Example 1 except that the same amounts of 2-(N-methylanilino)-1,3,5-triazine-4,6-dithiol (MA-1) and 2-anilino-1,3,5-triazine-4,6-dithiol (MA-2) (i.e., n:m=1:1 in Reaction Scheme 11) were used instead of 2-(N-methylanilino)-1,3,5-triazine-4,6-dithiol (MA-1) in the polymerization reaction. The obtained polymer has a number average molecular weight of 37,900 Da and a weight average molecular weight of 89,400 Da.

Reaction Scheme 11

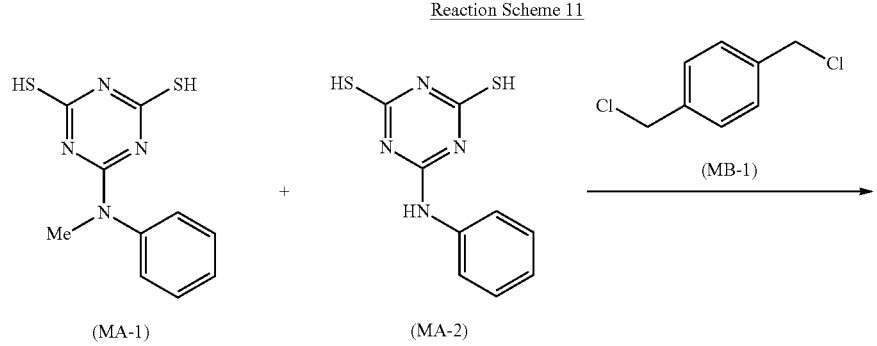

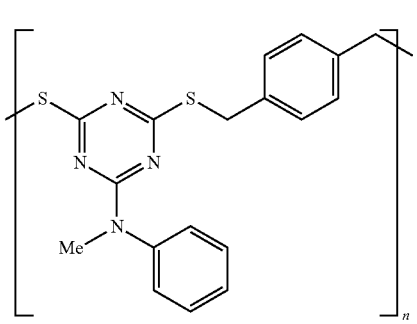

(P-5a)

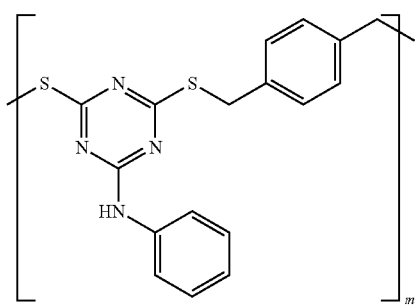

Example 15: Synthesis of Triazine Ring-Containing Polymer (P-6a)

A triazine ring-containing polymer (P-6a) was obtained according to the same method as Example 1 except that 2-methylthio-1,3,5-triazine-4,6-dithiol (MA-3) was used instead of 2-(N-methylanilino)-1,3,5-triazine-4,6-dithiol (MA-1) in the polymerization reaction. The obtained polymer has a number average molecular weight of 28,300 Da and a weight average molecular weight of 60,800 Da.

Reaction Scheme 12

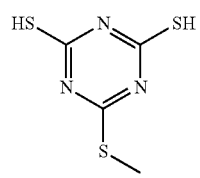
(MA-3)

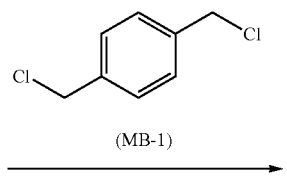
(MB-1)

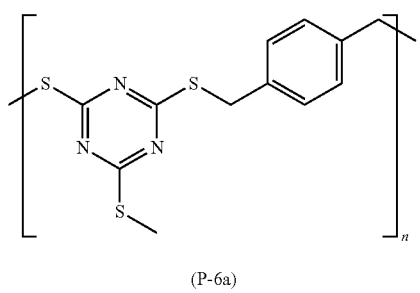
(P-6a)

Example 16: Synthesis of Triazine Ring-Containing Polymer (P-7a)

A triazine ring-containing polymer (P-7a) was obtained according to the same method as Example 1 except that 2-methoxy-1,3,5-triazine-4,6-dithiol (MA-4) was used instead of 2-(N-methylanilino)-1,3,5-triazine-4,6-dithiol (MA-1) in the polymerization reaction. The obtained polymer has a number average molecular weight of 38,100 Da and a weight average molecular weight of 93,300 Da.

Reaction Scheme 13

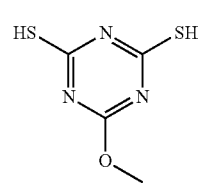
(MA-4)

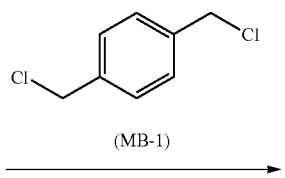
(MB-1)

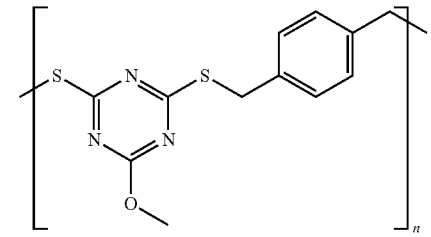
(P-7a)

Example 17: Synthesis of Triazine Ring-Containing Polymer (P-8a)

A triazine ring-containing polymer (P-8a) was obtained according to the same method as Example 15 except that 4,4'-bis(chloromethyl)biphenyl (MB-2) was used instead of α,α'-dichloro-p-xylene (MB-1) in the polymerization reaction. The obtained polymer has a number average molecular weight of 24,100 Da and a weight average molecular weight of 50,900 Da.

Reaction Scheme 14

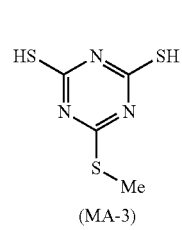
(MA-3)

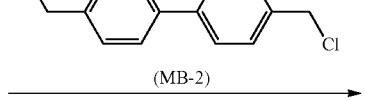
(MB-2)

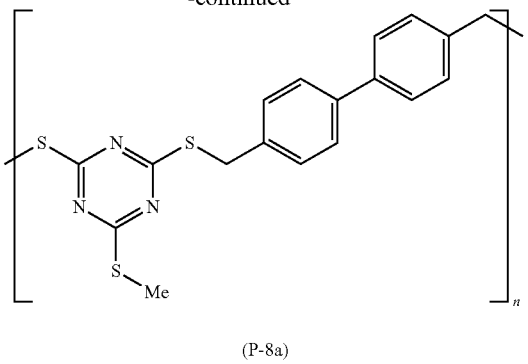

(P-8a)

Example 18: Synthesis of Triazine Ring-Containing Polymer (P-9a)

A triazine ring-containing polymer (P-9a) was obtained according to the same method as Example 17 except that the same amounts of 2-anilinio-1,3,5-triazine-4,6-dithiol (MA-2) and 2-methylthio-1,3,5-triazine-4,6-dithiol (MA-3) were used (i.e., n:m=1:1 in Reaction Scheme 15) instead of 2-methylthio-1,3,5-triazine-4,6-dithiol (MA-3) in the polymerization reaction. The obtained polymer has a number average molecular weight of 28,100 Da and a weight average molecular weight of 64,900 Da.

Reaction Scheme 15

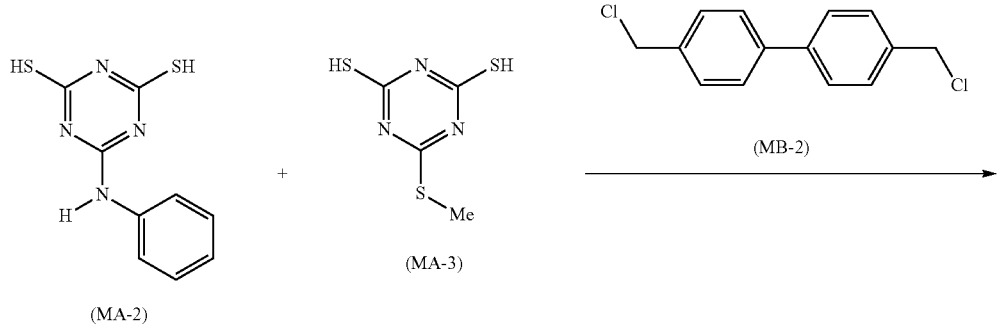

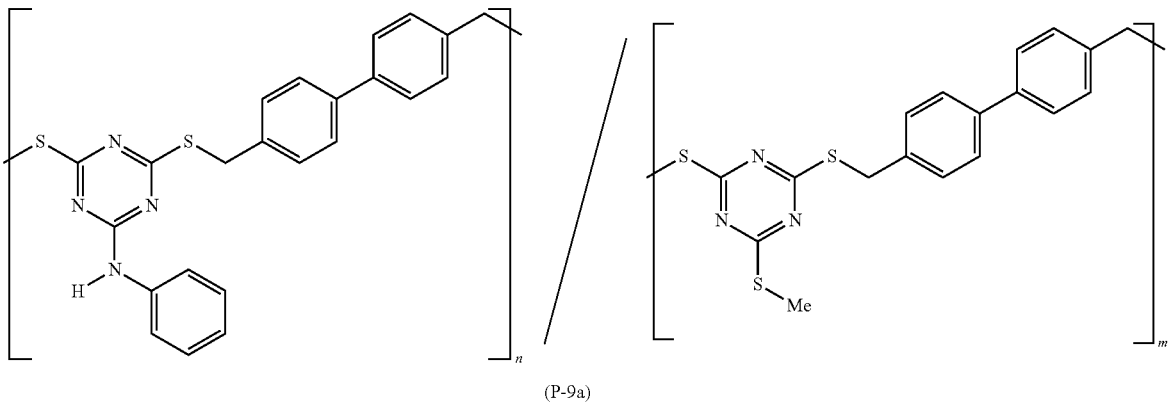

(P-9a)

Example 19: Synthesis of Triazine Ring-Containing Polymer (P-10a)

A triazine ring-containing polymer (P-10a) was obtained according to the same method as Example 17 except that the same amounts of 2-methylthio-1,3,5-triazine-4,6-dithiol (MA-3) and 2-methoxy-1,3,5-triazine-4,6-dithiol (MA-4) were used (i.e., n:m=1:1 in Reaction Scheme 16) instead of 2-methylthio-1,3,5-triazine-4,6-dithiol (MA-3) in the polymerization reaction. The obtained polymer has a number average molecular weight of 36,700 Da and a weight average molecular weight of 80,400 Da.

Reaction Scheme 16

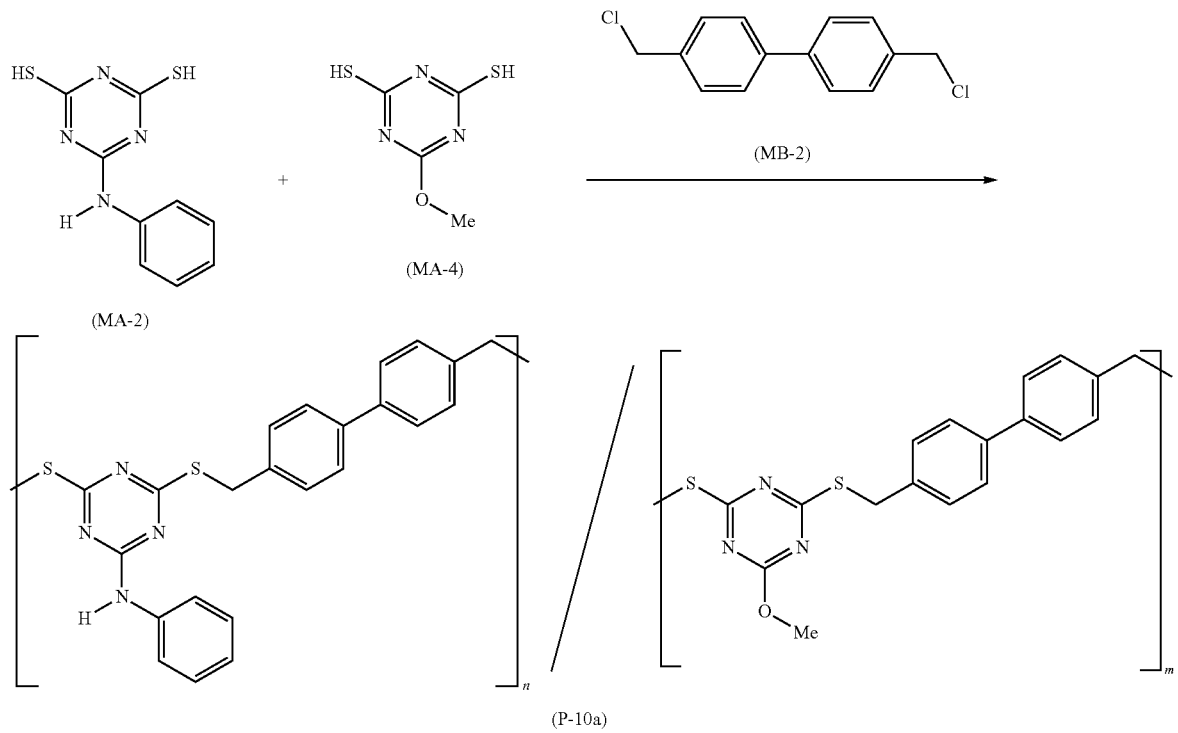

(P-10a)

Evaluation 3

Using the above measuring methods, the number of SH group, haze, and YI of the triazine ring-containing polymers of Examples 11 to 19 were measured. The results are shown in Table 4, along with the results of Example 1 and Comparative Example 1. In Examples 1 and 11 to 19, benzyl chloride was used as a capping agent, and the terminal capping treatment is performed in one-pot method. In Comparative Example 1, the terminal of the polymer was not capped with a capping agent.

TABLE 4

| | Polymer | Monomers A | B | Number of SH group (No./gram) | Haze (%) | YI |
|---|---|---|---|---|---|---|
| Example 1 | P-1a | MA-1 | MB-1 | $1.9 \times 10^{17}$ | 1.9 | 0.7 |
| Example 11 | P-2a | MA-2 | MB-1 | $1.9 \times 10^{17}$ | 1.9 | 0.7 |
| Example 12 | P-3a | MA-1 | MB-2 | $1.8 \times 10^{17}$ | 1.8 | 0.7 |
| Example 13 | P-4a | MA-2 | MB-2 | $2.0 \times 10^{17}$ | 2.0 | 0.8 |
| Example 14 | P-5a | MA-1/MA-2 | MB-1 | $2.2 \times 10^{17}$ | 2.0 | 0.7 |
| Example 15 | P-6a | MA-3 | MB-1 | $1.7 \times 10^{17}$ | 1.8 | 0.6 |
| Example 16 | P-7a | MA-4 | MB-1 | $2.4 \times 10^{17}$ | 1.6 | 0.8 |
| Example 17 | P-8a | MA-3 | MB-2 | $1.9 \times 10^{17}$ | 1.8 | 0.7 |
| Example 18 | P-9a | MA-2/MA-3 | MB-2 | $1.9 \times 10^{17}$ | 1.9 | 0.9 |
| Example 19 | P-10a | MA-2/MA-4 | MB-2 | $2.1 \times 10^{17}$ | 1.8 | 0.9 |
| Comparative Example 1 | P-1 | MA-1 | MB-1 | $1.0 \times 10^{19}$ | 4.0 | 3.0 |

As shown in Table 4, the polymers according to Examples 11 to 19, of which the terminals are capped in one-pot method, have two orders (~$10^2$) reduced number of SH groups compared with that of Comparative Example 1, of which the terminal is not capped. Further, the polymers according to Examples 11 to 19, of which the terminals are capped, have 50% to 60% reduced haze and 70% to 80% reduced YI compared with that of Comparative Example 1. From the results, it is noted that haze and YI may be reduced by lowering the number of SH group at the terminal end of the polymer, regardless of the specific type of the structural unit A or structural unit B.

Evaluation 4

Using the above measuring method, the refractive indices of Examples 1, 3, and 4, and Comparative Example 1 were measured. The results are shown in Table 5.

TABLE 5

| | Polymer | Capping Agent | Refractive Index ($n_d$) | |
|---|---|---|---|---|
| Example 1 | P-1a | Benzene Dichloride | 1.70 | One-pot |
| Example 3 | P-1c | α-chloro-p-xylene | 1.70 | One-pot |
| Example 4 | P-1a' | Benzene Dichloride | 1.70 | Terminal treatment after purification |
| Comparative Example 1 | P-1 | none | 1.70 | Not treated terminal |

As shown in Table 5, it is noted that the refractive indices $n_d$ of the polymers are the same as each other regardless of the differences in type of capping agent (or the functional group at terminal end of a polymer), type of method of treating the terminal end of the polymer (or the number of SH groups), or the like. From the results, the structure of the terminal end of a polymer does not affect the refractive index $n_d$.

Evaluation 5

Lenses were prepared by injection molding the polymers according to Example 1 and Comparative Example 1. Specifically, each polymer was put into an injection mold machine (SE30DUZ produced by Sumitomo Heavy Industries Ltd.) and continuously molded to lenses under the conditions of the nozzle temperature of 240° C., die temperature of 100° C., injection speed of 50 mm/second, pressure of 100 Mega Pascals. The obtained lenses were evaluated for the following items.

Item 1

The obtained lenses were evaluated by visual inspection.

Bubbles were not seen in the lenses fabricated from the polymer of Example 1, while the lenses fabricated from the polymer of Comparative Example 1 showed some bubbles. Bubbles may be produced when polymer is degraded by heat. From these results, thermal stability when subjected to injection molding may be improved by reducing the number of SH groups at the terminal of the polymer.

Item 2

Using the above measuring methods, haze and YI of the lenses obtained from every shot of the injection molding were measured by using the instruments described above. FIG. 1 shows haze versus shot numbers of the injection molding, and FIG. 2 shows YI versus shot numbers of the injection molding.

In FIG. 1, haze is represented as a relative value to the haze of 100 of the lenses obtained from the first shot of the injection molding. In the same manner, in FIG. 2, YI is represented as a relative value to the YI of 100 of the lenses obtained from the first shot of the injection molding.

Figure 2:
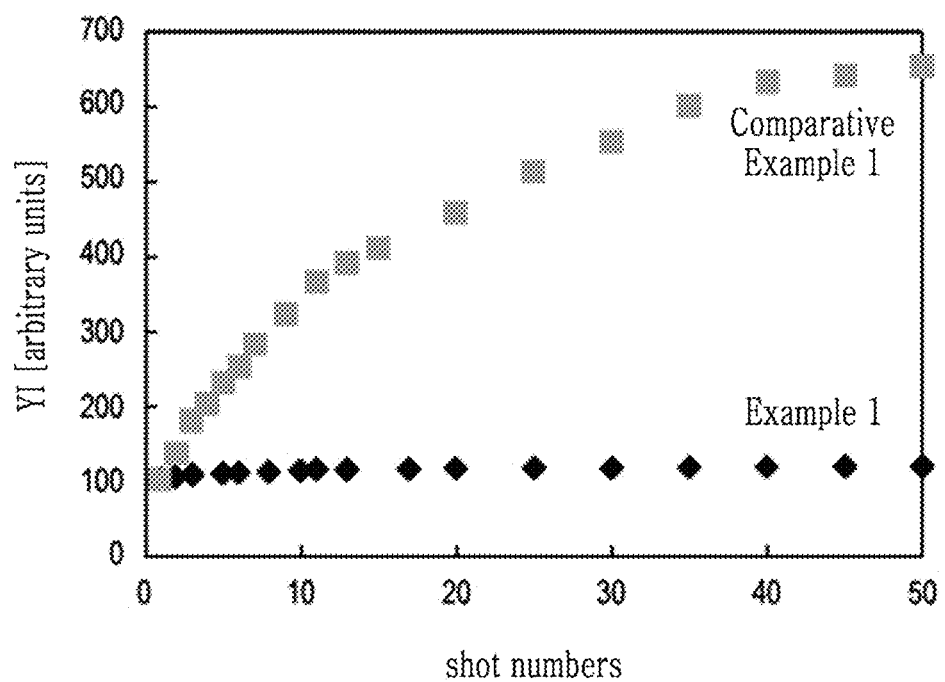
FIG. 2 is a graph showing yellowness index (YI) versus shot numbers of the injection molding obtained in Example 1 and Comparative Example 1.

Referring to FIG. 1 and FIG. 2, while the haze and YI barely increased in the lenses fabricated from the polymer according to Example 1, even when the shot numbers increased, those of the lenses fabricated from the polymer of Comparative Example 1 significantly increased as the shot numbers increase.

As the shot number increases, the time during which the heat of injection molding is treated become longer, and thus, the thermal stability of the polymer may have improved thermal stability by reducing the number of the SH groups at the terminal end of the polymer.

TABLE 6

| | Polymer | Haze (%) | YI | |
|---|---|---|---|---|
| Example 1 | P-1a | 2.0 | 1.7 | The first shot of injection molding |
| | | 2.4 | 1.8 | The fifty's shot of injection molding |
| Comparative Example 1 | P-1 | 4.2 | 5.0 | The first shot of injection molding |
| | | 10.5 | 33 | The fifty's shot of injection molding |

As shown in Table 6, the triazine ring-containing polymer according to an embodiment has high refractive index, as well as low YI of less than or equal to 2, low haze of less than or equal to 3%, and excellent thermal stability for a long period. Therefore, the triazine ring-containing polymer of the presently disclosed subject matter may be advantageously used as for fabricating an optical part, specifically, for example, lenses of a cellular phone, and the like, as it has excellent optical properties, while being able to be continuously injection molded.

While this disclosure has been described in connection with what is presently considered to be practical example embodiments, it is to be understood that the disclosure is not limited to the disclosed exemplary embodiments, but, on the contrary, is intended to cover various modifications and equivalent arrangements included within the spirit and scope of the appended claims.

What is claimed is:

1. A triazine ring-containing polymer having a repeating unit that comprises:
    a structural unit derived from a triazine dithiol compound,
    the triazine ring-containing polymer comprising terminal SH groups and a portion of terminal groups that are capped with a hydrocarbon group, and
    wherein a number of the SH groups in the triazine ring-containing polymer is less than about $1 \times 10^{18}$ per gram of the polymer, and the polymer has a yellowness index of less than 3.

2. The triazine ring-containing polymer of claim 1, wherein the hydrocarbon group is represented by any one of Chemical Formulae (a-1) to (a-3):

  (a-1)

  (a-2)

  (a-3)

wherein in Chemical Formula (a-1), m indicates an integer ranging from 1 to 6;
wherein in Chemical Formula (a-2), $Ar_1$ indicates a substituted or unsubstituted aromatic hydrocarbon group;
wherein in Chemical Formula (a-3), n indicates an integer ranging from 1 to 6, and $Ar_2$ indicates a substituted or unsubstituted aromatic hydrocarbon group; and
* indicates a point linked to another structural unit or atom.

3. The triazine ring-containing polymer of claim 1, wherein the hydrocarbon group is represented by any one of the following groups:

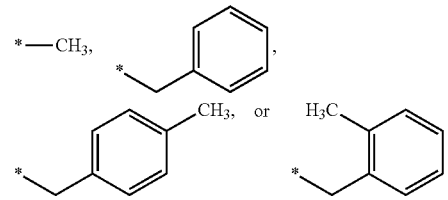

wherein * indicates a point linked to another structural unit or atom.

4. The triazine ring-containing polymer of claim 1, wherein the repeating unit is represented by General Formula 1:

  General Formula 1 wherein, in General Formula 1,
A is represented by General Formula 2,
B is represented by General Formula 3, and
* indicates a point linked to another structural unit or atom;

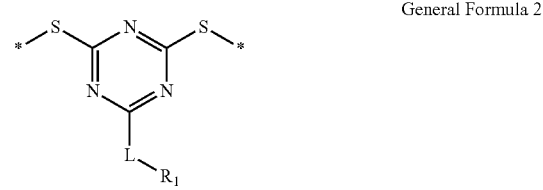

General Formula 2 wherein, in General Formula 2,

L is a single bond or a linking group, $R_1$ is a group comprising an oxygen atom, sulfur atom, nitrogen atom, selenium atom, or a combination thereof, and \* indicates a point linked to another structural unit or atom;

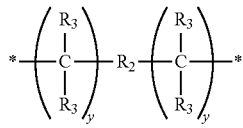

General Formula 3 wherein, in General Formula 3, $R_2$ is a divalent aromatic hydrocarbon group, or an aromatic hydrocarbon linking group in which two or more aromatic hydrocarbon groups are linked to each other by an alkylene group, an oxygen atom, a sulfur atom, or a selenium atom, $R_3$ is each independently a hydrogen atom, an alkyl group, or an aromatic hydrocarbon group, y is each independently 0 or 1, and \* indicates a point linked to another group or structural unit.

5. The triazine ring-containing polymer of claim 4, wherein when L of General Formula 2 is a linking group, the linking group is a C1 to C6 alkylene group, a divalent C6 to C30 aromatic hydrocarbon group, or an aromatic hydrocarbon linking group in which two or more C6 to C30 aromatic hydrocarbon groups are linked to each other by a single bond, a C1 to C6 alkylene group, or an atom of oxygen, sulfur, or selenium.

6. The triazine ring-containing polymer of claim 4, wherein L of General Formula 2 is a single bond, a methylene group, an ethylene group, a phenylene group, a biphenylene group, or a naphthalene group.

7. The triazine ring-containing polymer of claim 4, wherein L of General Formula 2 is a single bond.

8. The triazine ring-containing polymer of claim 4, wherein $R_1$ of General Formula 2 is represented by any one of Formulae (4-1) to (4-8):

$$*-S-C_mH_{2m+1} \quad (4\text{-}1)$$

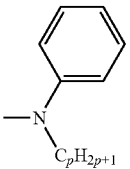 (4-2-1)

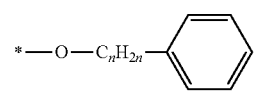 (4-2-2)

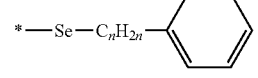 (4-3)

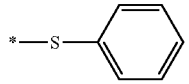 (4-4)

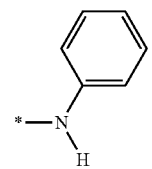 (4-4)

$$*-O-C_mH_{2m+1} \quad (4\text{-}5)$$

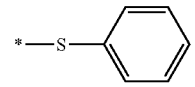 (4-6)

$$*-Se-C_mH_{2m+1} \quad (4\text{-}7)$$

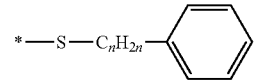 (4-8)

wherein, in Formula (4-1), (4-5), and (4-7), m is independently an integer of 1 to 6, in Formula (4-2-2), (4-6), and (4-8), n is independently an integer of 1 to 6, in Formula (4-4), p is independently an integer of 1 to 6, and \* indicates a point linked to another group or structural unit.

9. The triazine ring-containing polymer of claim 4, wherein $R_1$ of General Formula 2 is represented by any one of Formulae (4-1) to (4-4):

$$*-S-C_mH_{2m+1} \quad (4\text{-}1)$$

(4-2-1)

(4-2-2)

(4-3)

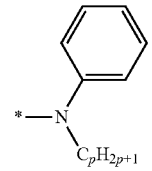 (4-4)

wherein, in Formula (4-1), m is independently an integer of 1 to 6, in Formula (4-2-2), n is independently an integer of 1 to 6, in Formula (4-4), p is independently an integer of 1 to 6, and

* indicates a point linked to another group or structural unit.

10. The triazine ring-containing polymer of claim 4, wherein $R_2$ of General Formula 3 is represented by any one of the following groups:

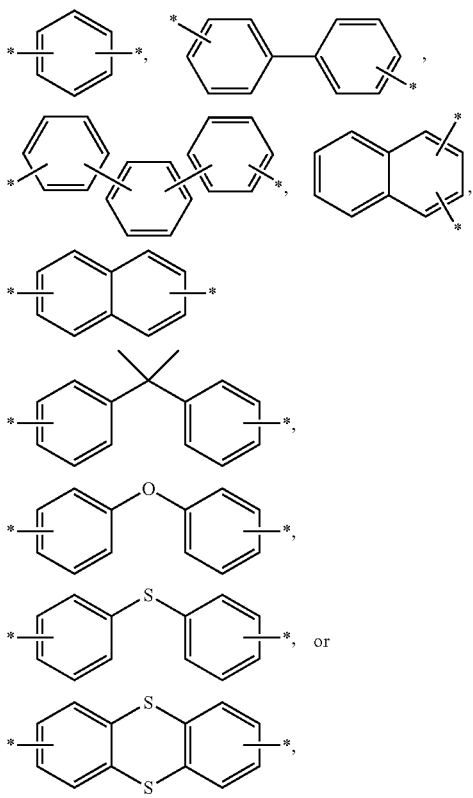

wherein * indicates a point linked to another group or structural unit.

11. The triazine ring-containing polymer of claim 4, wherein $R_2$ of General Formula 3 is represented by any one of the following groups:

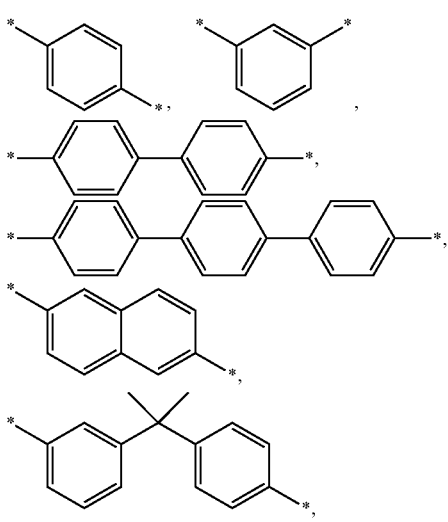

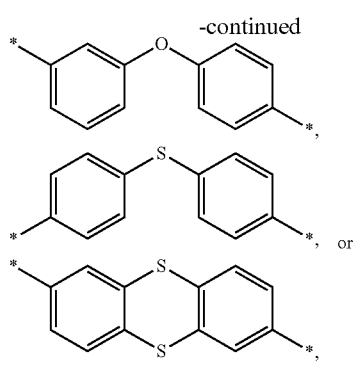

and
wherein * indicates a point linked to another group or structural unit.

12. The triazine ring-containing polymer of claim 4, wherein $R_2$ of General Formula 3 is represented by any one of the following chemical formulae:

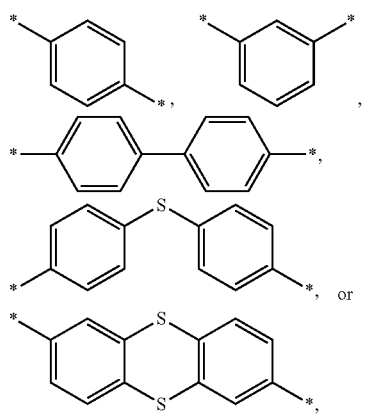

and
wherein * indicates a point linked to another group or structural unit.

13. The triazine ring-containing polymer of claim 4, comprising a repeating unit represented by General Formula (1-1) and a repeating unit represented by General Formula (1-2):

*-[A'-B-]-*    (1-1)

*-[A''-B-]-*   (1-2)

wherein, in General Formula (1-1) and General Formula (1-2),
A' and A'' are each independently represented by General Formula 2, wherein A' and A'' are different from each other,
B is represented by General Formula 3, wherein in General Formula (1-1) and General Formula (1-2), B is the same, and
* indicates a point linked to another group or structural unit.

14. The triazine ring-containing polymer of claim 4, comprising a repeating unit represented by General Formula (1-3) and a repeating unit represented by General Formula (1-4):

*-[A-B'-]-*    (1-3)

*-[A-B''-]-*   (1-4)

wherein, in General Formula (1-3) and General Formula (1-4),

A is represented by General Formula 2, wherein in General Formula (1-3) and General Formula (1-4), A is the same, B' and B" are each independently represented by General Formula 3, wherein in General Formula (1-3) and General Formula (1-4), B' and B" are different from each other, and \* indicates a point linked to another group or structural unit.

15. The triazine ring-containing polymer of claim 4, comprising a repeating unit represented by General Formula (1-5), a repeating unit represented by General Formula (1-6), a repeating unit represented by General Formula (1-7), and a repeating unit represented by General Formula (1-8):

\*-[A'-B'-]-\*     (1-5)

\*-[A"-B'-]-\*     (1-6)

\*-[A'-B"-]-\*     (1-7)

\*[A"-B"]\*     (1-8)

wherein, in General Formulae (1-5), (1-6), (1-7), and (1-8),

A', and A" are each independently represented by General Formula 2, wherein A' and A" are different, B' and B" are each independently represented by General Formula 3, wherein B' and B" are different, and \* indicates a point linked to another group or structural unit.

16. A thermoplastic article comprising the triazine ring-containing polymer of claim 1.

17. An optical part comprising the triazine ring-containing polymer of claim 1.

18. The thermoplastic article of claim 16, wherein the article exhibits little increase in yellow index after 20 shot numbers of injection molding under the conditions of the nozzle temperature of 240° C., die temperature of 100° C., injection speed of 50 mm/second, pressure of 100 Mega Pascals.

19. The thermoplastic article of claim 18, wherein the article exhibits less than a 20% increase in haze after the 20 shot numbers of injection molding.

\* \* \* \* \*